(12) United States Patent
Yamatsu et al.

(10) Patent No.: US 7,960,092 B2
(45) Date of Patent: Jun. 14, 2011

(54) METHOD OF RECORDING IN AN OPTICAL INFORMATION RECORDING MEDIUM

(75) Inventors: Hisayuki Yamatsu, Tokyo (JP); Norihiro Tanabe, Saitama (JP); Hiroshi Uchiyama, Miyagi (JP)

(73) Assignee: Sony Corporation, Tokyo (JP)

( * ) Notice: Subject to any disclaimer, the term of this patent is extended or adjusted under 35 U.S.C. 154(b) by 759 days.

(21) Appl. No.: 11/873,011

(22) Filed: Oct. 16, 2007

(65) Prior Publication Data

US 2008/0205257 A1 Aug. 28, 2008

(30) Foreign Application Priority Data

Oct. 23, 2006 (JP) ................. 2006-288115

(51) Int. Cl.
*G11B 7/24* (2006.01)

(52) U.S. Cl. ............. 430/270.11; 430/945; 428/64.8; 369/283; 369/288

(58) Field of Classification Search ................... None
See application file for complete search history.

(56) References Cited

U.S. PATENT DOCUMENTS

| | | | | |
|---|---|---|---|---|
| 5,874,187 | A * | 2/1999 | Colvin et al. ............ | 430/2 |
| 7,129,006 | B2 * | 10/2006 | Hesselink et al. ........ | 430/1 |
| 7,297,448 | B2 * | 11/2007 | Cetin et al. .............. | 430/1 |
| 2005/0208431 | A1 * | 9/2005 | Devoe et al. ............. | 430/321 |
| 2006/0152784 | A1 * | 7/2006 | Usami .................... | 359/28 |
| 2008/0186840 | A1 | 8/2008 | Uchiyama et al. | |
| 2010/0047506 | A1 | 2/2010 | Uchiyama et al. | |

FOREIGN PATENT DOCUMENTS

| | | |
|---|---|---|
| JP | 2002-282784 | * 10/2002 |
| WO | 2007/120630 | * 10/2007 |

OTHER PUBLICATIONS

Ventura et al., "Void channel microstructures in resin solids as an efficient way to infrared photonic crystals." Appl. Phys. Lett., vol. 82(11) pp. 1649-1651 (Mar. 2003).*
Webster "The development of a pressure sensitive adhesive for trauma-free removal" Int. J. Adhes. & Adhes., vol. 19 pp. 29-34 (1999).*
Crivello et asl. "Analysis of photopolymerizations using optical pyrometry", RADTECH report pp. 36-43 (May 2004).*
Joudkazis et al., "Photoelectrochemical deposition of platnium . . . ", Jpn. J. Appl. Phys., vol. 40, part 1, (6A), pp. 4246-4251 (2001).*

* cited by examiner

*Primary Examiner* — Martin J Angebranndt
(74) *Attorney, Agent, or Firm* — Oblon, Spivak, McClelland, Maier & Neustadt, L.L.P.

(57) ABSTRACT

An optical information recording and reproducing device 1 irradiates initialization light L1 to an optical information recording medium 100 having a recording layer 101 made of photopolymerization-type photopolymer in advance to bring about the photopolymerization or the photocrosslinking to perform the initialization processing, and condenses a recording light beam L2c having a comparatively strong light intensity to a target position in the recording layer 101 and increases the temperature thereof to transubstantiate the target position to record a recording mark RM at the time of recording information, and condenses a reading light beam L2d having a comparatively weak light intensity to the target position and receives a returned light beam L3 having a sufficient light amount reflected by the recording mark RM at the time of reproducing information, which makes it possible to reliably record the recording mark RM and stably read out the recording mark RM.

2 Claims, 22 Drawing Sheets

INITIALIZING OPTICAL INFORMATION RECORDING MEDIUM

RECORDING INFORMATION

REPRODUCING INFORMATION

IN CASE RECORDING MARK IS NOT FORMED

IN CASE OF BEING INITIALIZED BY LASER

IN CASE OF BEING INITIALIZED BY LED

FIRST LAYER

THIRD LAYER

FIFTH LAYER

PERSPECTIVE VIEW

TOP VIEW

CROSS-SECTIONAL VIEW

RECORDING INFORMATION

REPRODUCING INFORMATION

SECOND LAYER

FIFTH LAYER

METHOD OF RECORDING IN AN OPTICAL INFORMATION RECORDING MEDIUM

CROSS REFERENCE TO RELATED APPLICATIONS

The present invention contains subject matter related to Japanese Patent Application JP2006-288115 filed in the Japanese Patent Office on Oct. 23, 2006, the entire contents of which being incorporated herein by reference.

BACKGROUND OF THE INVENTION

1. Field of the Invention

This invention relates to an optical information recording medium, which is desirably applied to an optical information recording medium on which information is recorded/reproduced using a light beam, for example.

2. Description of the Related Art

As an optical information recording device, an optical disc is in widespread use, and, in general, a compact disc (CD), a digital versatile disc (DVD), a Blu-ray disc (registered trademark, referred to as BD, hereinafter), etc. are used.

On the other hand, the optical disc device corresponding to the optical disc is so configured as to record various kinds of information, or various contents such as music contents and video contents, various data for computers to the optical disc. Especially, in recent years, since the amount of information is increased since the video data becomes highly detailed and the music data becomes high in quality, and the number of contents to be recorded in a single optical disc is required to be increased, the optical disc is required to have a further increased capacity.

Accordingly, as a technique to make an optical disc have a large capacity, there has been suggested a technique that records information by making two types of light beams interfere with each other to form minute holograms in a recording medium (for example, refer to Jpn. Pat. Appln. Laid-Open Publication No. 2006-78834 [FIG. 1]).

SUMMARY OF THE INVENTION

However, since thus configured optical disc device using the optical disc has to perform a high-level control of concurrently making the focal points of two kinds of light beams accord with each other on a point of a rotating and swinging optical disc characterized in that information is to be recorded, the configuration comes to be complicated, which raises a problem of making it difficult to record and reproduce information stably.

In view of the above, the present invention provides an optical information recording medium, which is simply configured, and can record and reproduce information stably.

In order to achieve the above object, the optical information recording medium of the present invention, which is made of resin provided with a photopolymerization property or a photocrosslinking property or both of the properties, and has a recording layer on which, after predetermined initialization light is irradiated and the resin is hardened, at the time of recording information, a cavity as a recording mark is formed when predetermined recording light is condensed to the medium, and a temperature near a focal point of the recording light is increased, and at the time of reproducing information, the information is reproduced based on returned light according to irradiating of predetermined reading light.

The optical information recording medium forms the recording mark which is a cavity made when the recording light is condensed, and reflects the reading light using difference of refractive index between the resin and the cavity at a time of irradiating the reading light to the recording mark, which can obtain a high-quality reproduced signal based on whether the reading light is reflected or not.

According to the present invention, the optical information recording medium forms the recording mark which is a cavity made when the recording light is condensed, and reflects the reading light using difference of refractive index between the resin and the cavity at a time of irradiating the reading light to the recording mark, which can obtain a high-quality reproduced signal based on whether the reading light is reflected or not. Accordingly, it is possible to realize an optical information recording medium which is simply configured and can record and reproduce information stably.

The nature, principle and utility of the invention will become more apparent from the following detailed description when read in conjunction with the accompanying drawings in which like parts are designated by like reference numerals or characters.

DETAILED DESCRIPTION OF PREFERRED EMBODIMENTS

An embodiment of the present invention will be described by referring to the accompanying drawings.

(1) First Embodiment

Figure 1:
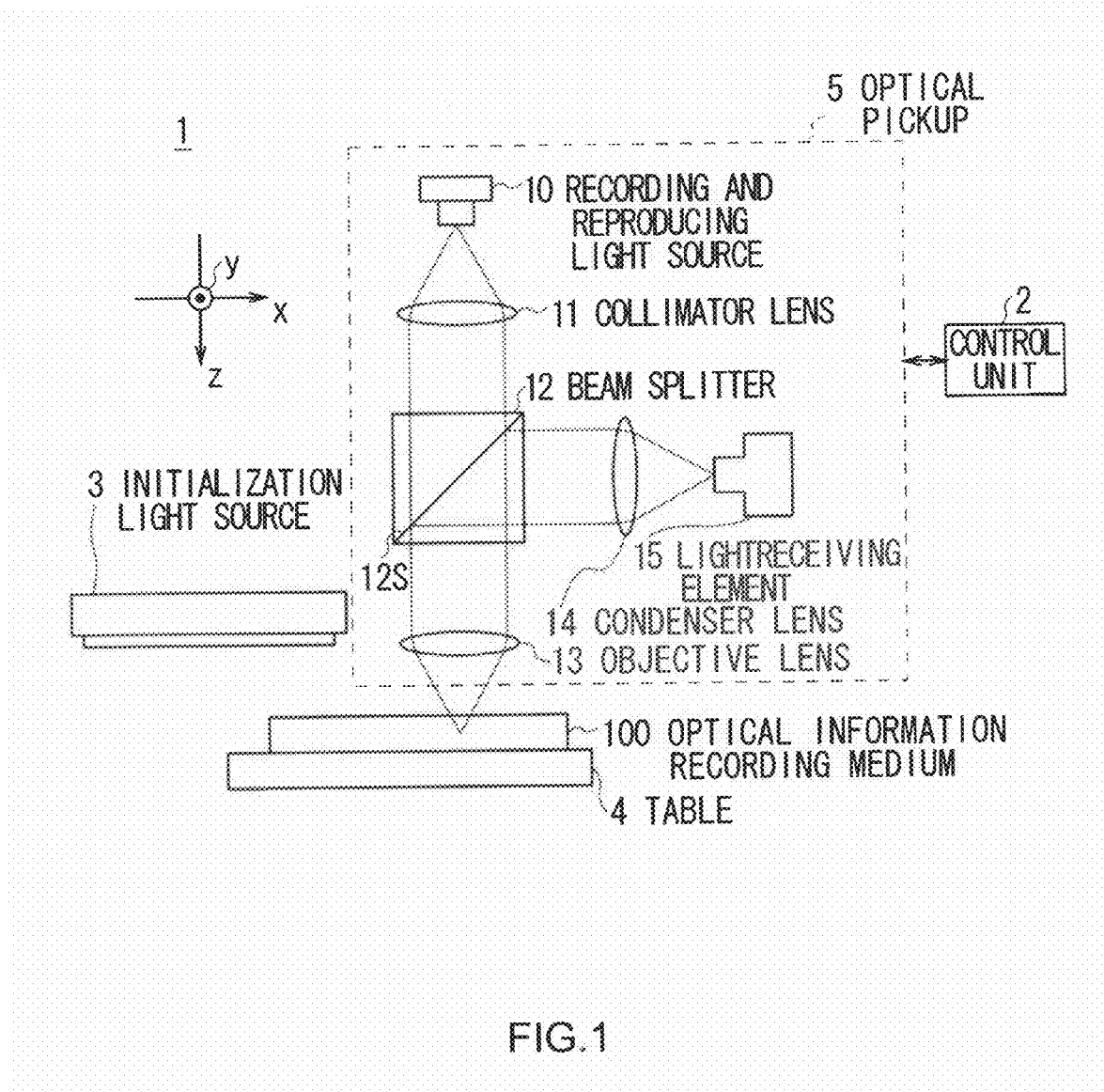
FIG. 1 is a schematic view indicative of the configuration of an optical information recording and reproducing device according to a first embodiment of the present invention.

As shown in FIG. 1, as a whole, an optical information recording and reproducing device 1 according to a first embodiment is so configured as to record information and reproduce thus recorded information by irradiating light to an optical information recording medium 100.

The optical information recording and reproducing device 1 is totally controlled by a control unit 2 configured by a central processing unit (CPU), which reads out various programs such as a base program, an information recording program, an information reproducing program from a read only memory (ROM), not shown, and expands these programs in a random access memory (RAM), not shown, to execute various processing such as information recording processing and information reproducing processing.

The control unit 2 controls an initialization light source 3 to make the initialization light source 3 irradiate initialization light L1 of, for example, 532 nm in wavelength, and output the initialization light L1 to the optical information recording medium 100 in the form of a plate fixed on a table 4.

As the initialization light source 3, a light source which can irradiate light of high power such as a solid laser, and a semiconductor laser is used.

Furthermore, the initialization light source 3 has a drive unit, not shown, and is freely shifted in the "x" direction (right direction in FIG. 1) and in the "y" direction (forward direction in FIG. 1) to uniformly irradiate the initialization light L1 to the optical information recording medium 100 from an appropriate position, under the control of the control unit 2.

On the other hand, the control unit 2 controls an optical pickup 5 to make the optical pickup 5 irradiate light to the optical information recording medium 100, and receives light returned from the optical information recording medium 100.

Under the control of the control unit 2, the optical pickup 5 makes a recording and reproducing light source 10 configured by a laser diode irradiate a light beam L2 of, for example, 532 nm in wavelength, and makes a collimator lens 11 convert the light beam L2 from divergent light to parallel light to make the resulting light go to a beam splitter 12.

Under the control of the control unit 2, the recording and reproducing light source 10 adjusts the amount of light of the light beam L2.

The beam splitter 12 makes part of the light beam L2 transmit therethrough using a reflection/transmission surface 12S to make the resulting light go to an objective lens 13. The objective lens 13 condenses the light beam L2 to bring the light beam L2 to focus in the optical information recording medium 100.

Furthermore, when a returned light beam L3 is returned from the optical information recording medium 100, the objective lens 13 converts the returned light beam L3 to parallel light to make the resulting light go to the beam splitter 12. At this time, the beam splitter 12 reflects part of the returned light beam L3 using the reflection/transmission surface 12S to make the resulting light go to a condenser lens 14.

The condenser lens 14 condenses the returned light beam L3 to make the returned light beam L3 to focus on the light receiving surface of a light receiving element 15. Accordingly, the light receiving element 15 detects the amount of light of the returned light beam L3, and generates a detection signal according to the light amount to send thus generated detection signal to the control unit 2. In this way, based on the detection signal, the control unit 2 can recognize the detection state of the returned light beam L3.

The optical pickup 5 has a drive unit, not shown, and is freely shifted in the three axis directions or the "x" direction, "y" direction, and "z" direction under the control of the control unit 2. Actually, the control unit 2 controls the position of the optical pickup 5 to set the focal point of the light beam L2 to a desired position.

In this way, the optical information recording and reproducing device 1 irradiates the initialization light L1 to the optical information recording medium 100, and condenses the light beam L2 to an arbitrary position in the optical information recording medium 100, and detects the returned light beam L3 returned from the optical information recording medium 100.

(1-2) Configuration of Optical Information Recording Medium

Figure 2A:
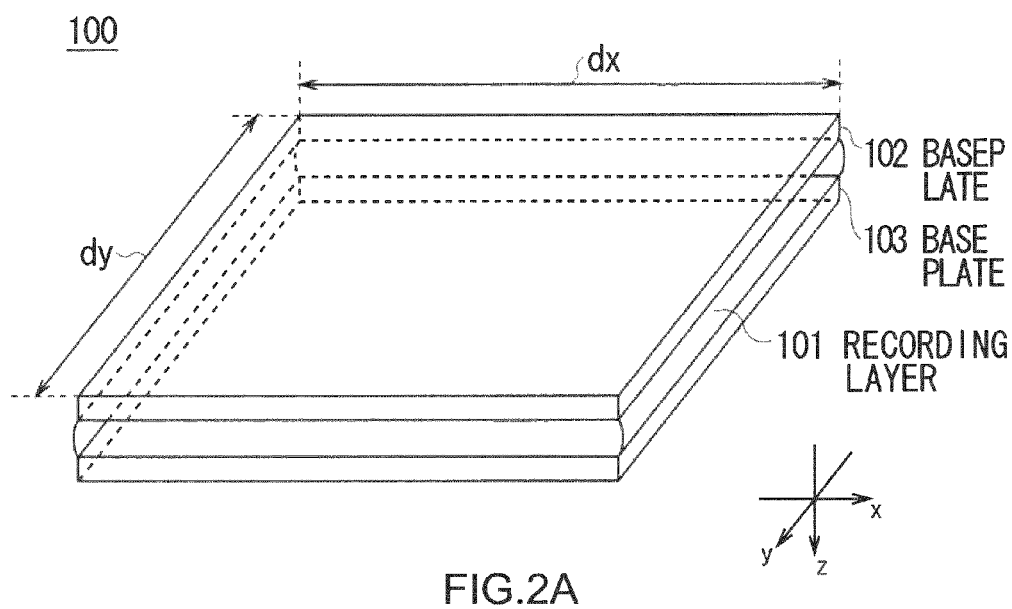
FIGS. 2A and 2B are schematic views indicative of the configuration of an optical information recording medium according to a first embodiment of the present invention.
Figure 2B:

As shown in FIGS. 2A and 2B, the optical information recording medium 100 includes a recording layer 101 which is formed into a flat plate and to which information is recorded, and base plates 102 and 103 which are formed into a flat plate respectively and sandwich the recording layer 101.

The recording layer 101 is made of photopolymerization-type photopolymer in which monomers and oligomers are uniformly dispersed. When light is irradiated to the recording layer 101, the monomers and the oligomers are polymerized (that is, photopolymerized) to be polymers at the part to which the light is irradiated, and the refractive index is changed accordingly. Furthermore, when light is irradiated to the recording layer 101 and the photocrosslinking is brought about therein, under which the "crosslinking" is performed between the polymers to increase the molecular weight, the refractive index thereof may further be changed.

Photopolymerization-type photopolymer configuring the recording layer 101 may be used as hologram media which records interference patterns brought about when making two kinds of light interfere with each other as holograms. In this case, in photopolymerization-type photopolymer, by changing the refractive index and reflection factor at part of interference patterns where the light intensity is large, the interference patterns can be recorded as information.

Actually, resin having a property of photopolymerization-type, photocrosslinking-type, or both types (to be referred to as photoreactive resin, hereinafter) configuring a part or large part of the recording layer 101 is formed by, for example, radical polymerization compound and photopolymerization initiator, or cationic polymerization compound and cation generating photopolymerization initiator. Furthermore, in the photoreactive resin and the photopolymerization initiator, especially in the photopolymerization initiator, when the material thereof is properly selected, the wavelength under which the photopolymerization is easily brought about can be adjusted to a desired wavelength.

Both the base plates 102 and 103 are formed by a glass plate, which can make the above-described light beam L2 and returned light beam L3 transmit therethrough sufficiently. Each of the base plates 102 and 103 is in the form of a square plate or a rectangle plate respectively, which has its length "dx" in the "x" direction and length "dy" in the "y" direction set approximately to 30 to 80 mm respectively, and has the thickness "t2" or "t3" in the "z" direction set approximately to 1 mm.

The recording layer 101 is relatively soft in the nature of the material, sandwiching by the base plates 102 and 103, and similar to the base plates 102 and 103, the recording layer 101 is in the form of a thin square plate or a thin rectangle plate which has its length "dx" in the "x" direction and length "dy" in the "y" direction set approximately to 30 to 80 mm respectively, and has its thickness "t1" in the "z" direction set approximately to 0.3 to 1 mm.

The optical information recording medium 100 in which the recording layer 101 made of photopolymerization-type photopolymer is sandwiched by the transparent base plates 102 and 103, is formed into a thin plate as a whole.

(1-3) Recording and Reproducing Information

Next, the manner of recording information to the optical information recording medium 100, and the manner of reproducing information from the optical information recording medium 100, by employing the optical information recording and reproducing device 1, will be explained.

Figure 3A:
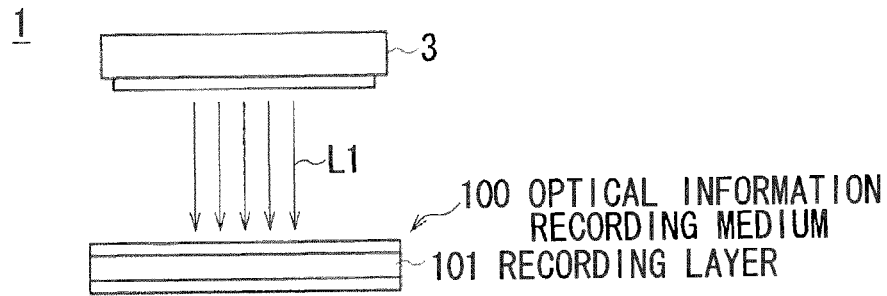
FIGS. 3A to 3C are schematic views to explain the processing of initializing the optical information recording medium, and recording and reproducing information according to a first embodiment of the present invention.
Figure 3B:
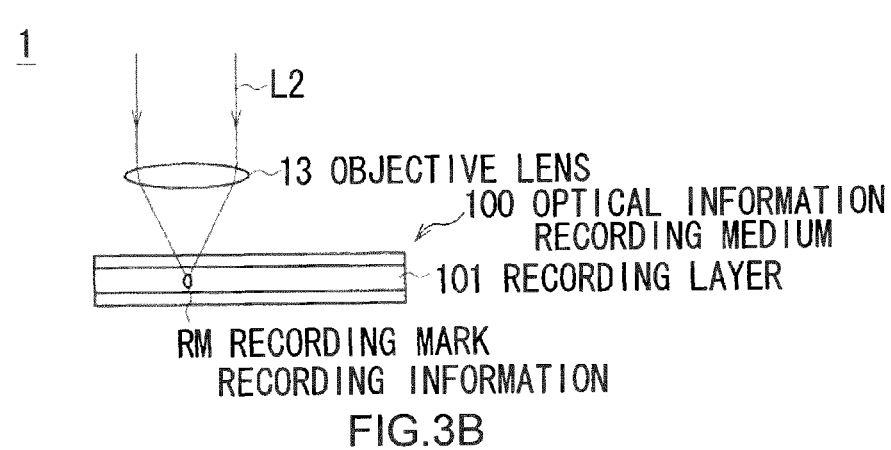
Figure 3C:
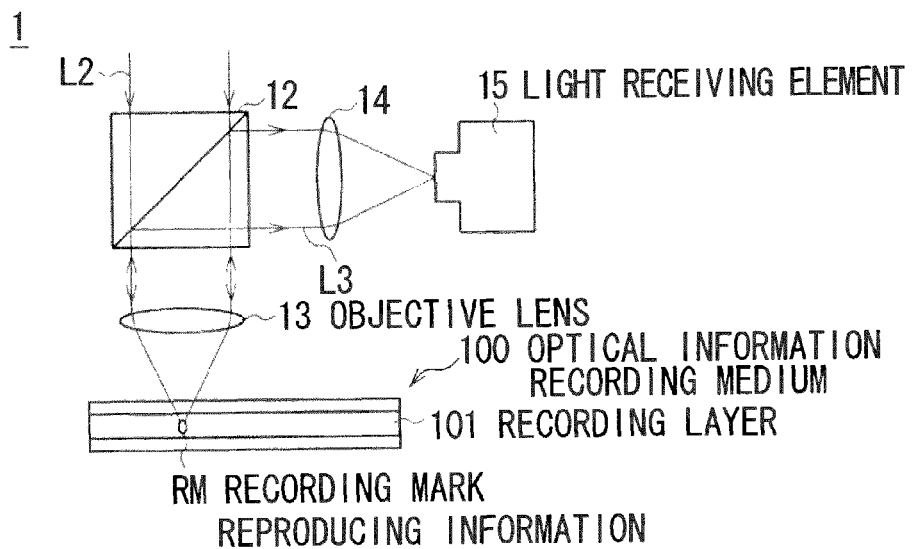

Actually, the optical information recording and reproducing device 1 performs three stages of processing, or initializing the optical information recording medium 100 (FIG. 3A), recording information to the optical information recording medium 100 (FIG. 3B), and reproducing information from the optical information recording medium 100 (FIG. 3C).

(1-3-1) Initializing Optical Information Recording Medium

As the preprocessing for recording information to the optical information recording medium 100, the optical information recording and reproducing device 1 initializes all or a part of the optical information recording medium 100. In this case, as shown in FIG. 3A, the optical information recording and reproducing device 1 irradiates the initialization light L1 to one side of the optical information recording medium 100 from the initialization light source 3 to initialize the recording layer 101 (precure process).

At this time, in the entire recording layer 101, since the photopolymerization reaction, the photocrosslinking reaction, or both reaction of them (collectively referred to as photoreaction, hereinafter) is brought about at the part to which initialization light L1 is irradiated, monomers are polymerized to be polymers, which changes the refractive index as compared with the state before radiating the initialization light.

In this case, since the photoreaction is brought about at the part to which initialization light L1 is irradiated in the entire recording layer 101 uniformly, the refractive index comes to be uniform. That is, in the optical information recording medium 100, when making the amount of light of the returned light correspond to the code "0" or "1" at the time of irradiating light, since any part of the optical information recording medium 100 comes to be the code "0" (or code "1") uniformly in this stage, no information is recorded at all. Accordingly, the optical information recording and reproducing device 1 also pre-formats the optical information recording medium 100.

On the other hand, instead of concurrently irradiating the initialization light L1 to the entire area of the optical information recording medium 100 using the initialization light source 3, only part of the optical information recording medium 100 may be initialized using a small-sized initialization light source that irradiates the initialization light L1 to a comparatively small area, or the entire recording layer 101 may be initialized using the small-sized initialization light source by arbitrarily shifting the small-sized initialization light source with respect to the optical information recording medium 100.

In the optical information recording and reproducing device 1, it can be considered that the initialization light L1 is condensed by a lens etc. to be irradiated to the recording layer 101. On the other hand, so as to perform the uniform initialization, it is desired that the initialization light L1 in the form of parallel light is directly irradiated to the recording layer 101. Additionally, for the initialization light source 3, it is possible to use a source which can radiate sufficient optical power such as a high pressure mercury lamp (for example, the dominant wavelength element of 365 nm), a high-pressure metal halide lamp, a solid-state laser, or a semiconductor laser.

(1-3-2) Recording Information

When recording information to the optical information recording medium 100, as shown in FIG. 3B, the optical information recording and reproducing device 1 condenses the light beam L2 for recording (referred to as recording light beam L2c, hereinafter) to the inside of the recording layer 101. In this case, the optical information recording and reproducing device 1 controls the position in the "x" direction, "y" direction, and "z" direction of the optical pickup 5 shown in FIG. 1, and brings the recording light beam L2c shown in FIG. 3B to a focus on a position which is targeted (referred to as target position, hereinafter) in the recording layer 101.

At this time, at the target position in the recording layer 101, the temperature locally increases since the recording light beam L2c is condensed, and photopolymer is transubstantiated.

Figure 4:
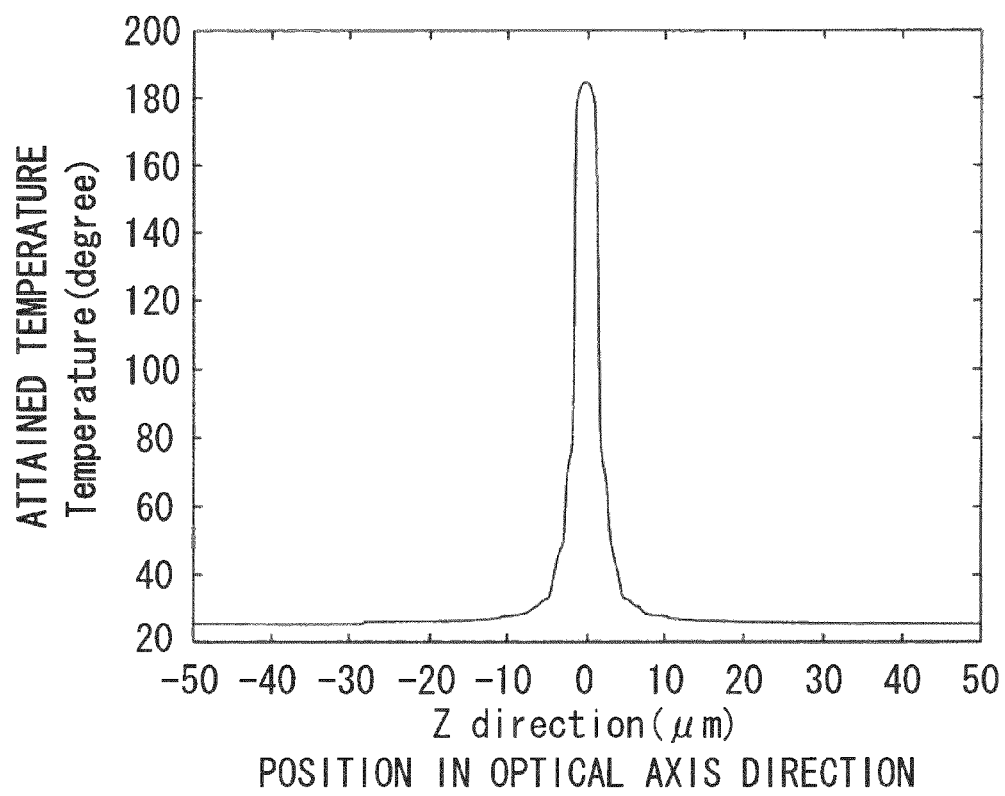
FIG. 4 is a schematic view indicative of the temperature distribution in the optical information recording medium at the time of condensing a recording light beam.

When the simulation of the temperature change in the optical information recording medium 100 in which the photopolymerization by the initialization has been completed is carried out, temperature distribution characteristics shown in FIG. 4 are obtained.

In this simulation, it is assumed that the thermal conductivity of photopolymer is set to 0.20 W/mK, the thermal diffusivity is set to $7.4 \times 10^{-8}$ m$^2$/sec, and the absorption coefficient at the time of 532 nm in wavelength is set to $2 \times 10^{-4}$, and further, a Numerical Aperture (NA) of the objective lens 13 is set to 0.5, the wavelength of the recording light beam L2c is set to 532 nm, and the optical power is set to 500 mW, and the temperature distribution with respect to the "z" direction with the target position set to the center when radiating the recording light beam L2c for 1 μsec under the room temperature of 25° C. is calculated.

From FIG. 4, it can be seen that, in the optical information recording medium 100, when the recording light beam L2c is irradiated, within a local range of approximately 4 μm with the target position being the center, the temperature reaches a high temperature exceeding approximately 180° C. Since it is assumed that the glass transition point of photopolymer configuring the recording layer 101 is set around 100° C. to 120° C., the temperature near the target position certainly exceeds the glass transition point, and it is considered that the state variation is brought about. In this case, in addition to the temperature rise, the possibility that state variation is attributable to the recording light beam L2c irradiated as light can be considered.

In addition, in a case where the recording layer contains organometal compound or inorganic metal compound, in the optical information recording medium 100, it is considered that, by means of heat in condensing the light, the organometal compound or the inorganic metal compound increases the temperature near the target position efficiently. Alternatively, in the recording layer 101, it is considered that the metal compound generated through transubstantiation of the organometal compound or the inorganic metal compound increases the temperature near the target position efficiently.

Furthermore, in the optical information recording medium 100, it is also considered that a material configuring the recording layer 101 is transubstantiated through a photochemical reaction or both a photochemical reaction and a thermochemical reaction by the recording light beam L2c. As a result, the cavity is formed. At this time in the optical information recording medium 100, it is also considered that the organometal compound, inorganic metal compound, or the generated metal compound accelerates the photochemical reaction or the thermochemical reaction.

In both cases, since the cavity formed near the target position in the optical information recording medium 100 differs in a refractive index from a surrounding material (that is, a material configuring the recording layer 101), a reflection factor of a light in the boundary surface is heightened.

As a result, as shown in FIG. 3B, a recording mark RM which is brought about when photopolymer is transubstantiated is formed around the target position. Note that it is difficult to confirm this recording mark RM visually.

Actually, it is so set up that the optical information recording and reproducing device 1 records the recording mark RM when binarized information is "1", and does not record the recording mark RM when binarized information is "0", which enables to record information to the optical information recording medium 100.

(1-3-3) Reproducing Information

When reading out information from the optical information recording medium 100, as shown in FIG. 3C, the optical information recording and reproducing device 1 condenses the light beam L2 for reading out (referred to as reading light beam L2d, hereinafter) to the inside of the recording layer 101. In this case, similar to the case of recording information, the optical information recording and reproducing device 1 controls the position in the "x" direction, "y" direction, and "z" direction of the optical pickup 5 shown in FIG. 1, and brings the reading light beam L2d shown in FIG. 3B to a focus on the target position in the recording layer 101.

When the returned light beam (also referred to as reproducing beam, hereinafter) L3 is returned from the optical information recording medium 100, the optical information recording and reproducing device 1 detects the returned light beam L3 using the light receiving element 15 through the objective lens 13, beam splitter 12, etc.

Figure 5A:
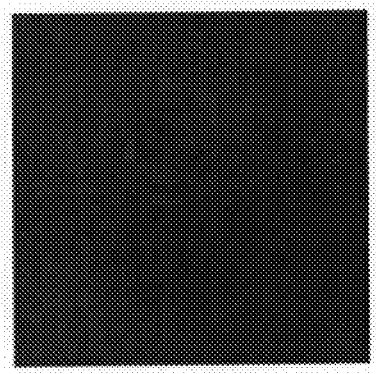
FIGS. 5A to 5C are schematic views indicative of the state of receiving a returned light beam according to a first embodiment of the present invention.
Figure 5B:
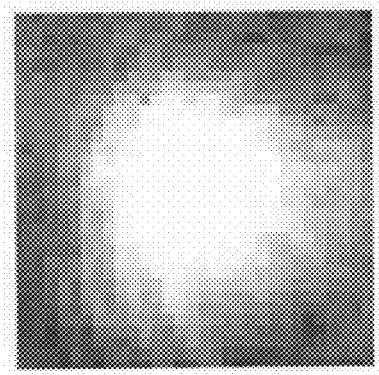
Figure 5C:
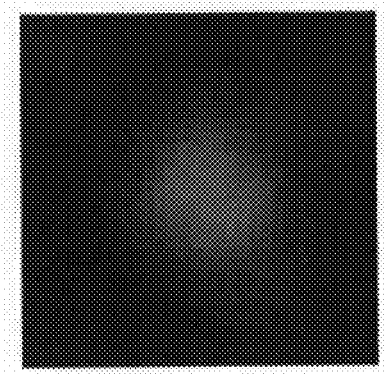

In case the recording mark RM is not recorded on the target position of the optical information recording medium 100, that is, in case the target position remains in the initialized state, as shown in FIG. 5A, the light receiving element 15 detects the significantly weak returned light beam L3. In FIGS. 5A to 5C, a part where the returned light beam L3 is intense is represented by white, while part where the beam is weak is represented by black.

On the other hand, in case the recording mark RM is recorded on the target position of the optical information recording medium 100, as shown in FIG. 5B, the light receiving element 15 can detect the significantly intense returned light beam L3.

FIG. 5B shows the result of receiving light which is obtained by, in initializing the optical information recording medium 100, the wavelength of the initialization light L1 is set to 532 nm, the optical power density is set to 200 mW/cm$^2$, and the initialization time period is set to 30 min, setting the wavelength of the light beam L2 used in recording and reproducing information to 532 nm similarly, setting the NA of the objective lens 13 to 0.5, setting the optical power of the recording light beam L2c to 450 mW, setting the recording time period to 1 sec, and setting the optical power of the reading light beam L2d to 50 μW.

Note that, the returned light beam L3 from the recording mark RM detected by the light receiving element 15 has a strong brightness as compared with reproduced light which can be detected when general μ (micro) holograms are formed in the optical information recording medium 100.

In this way, it can be confirmed that, by initializing the optical information recording medium 100 and performing the processing of recording information with respect to the target position, the optical information recording and reproducing device 1 can record information in the way of improving the reflection factor at the target position, and by performing the processing of reproducing information with respect to the target position, the optical information recording and reproducing device 1 can reproduce thus recorded information.

In this case, it can be considered that, in the optical information recording medium 100, since part (that is, around the target position) of photopolymer configuring the recording layer 101 to which the recording light beam L2c is condensed and the temperature thereof increases locally is transubstantiated, and the refractive index is changed, and consequently the reflection factor is improved (that is, the recording mark RM is formed).

Figure 6A:
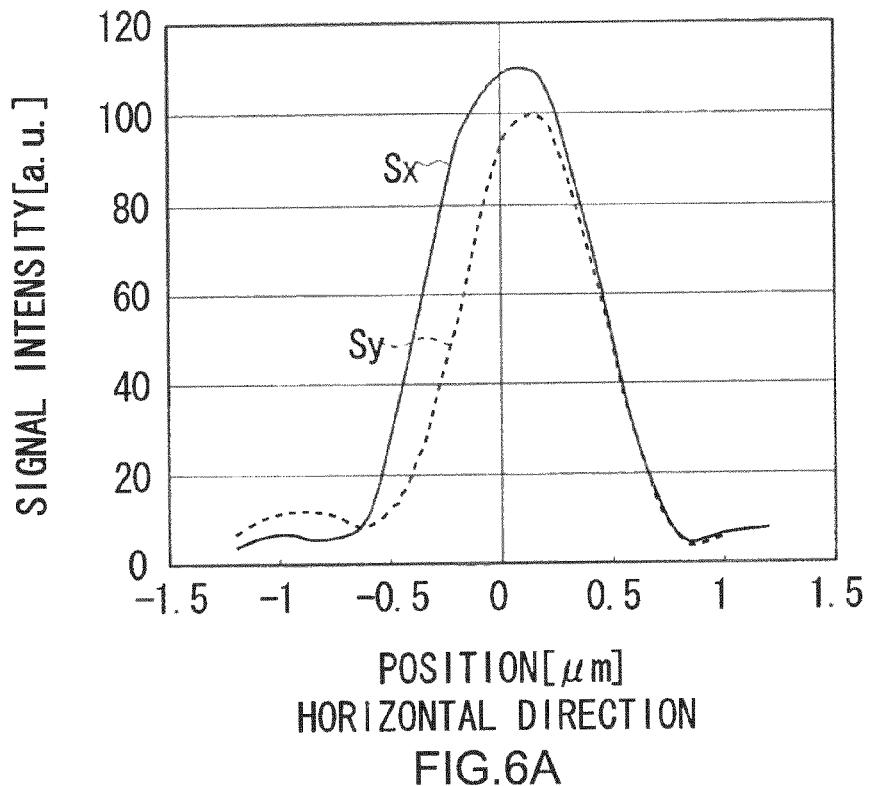
FIGS. 6A and 6B are schematic views indicative of the signal intensity distribution of the returned light beam.
Figure 6B:
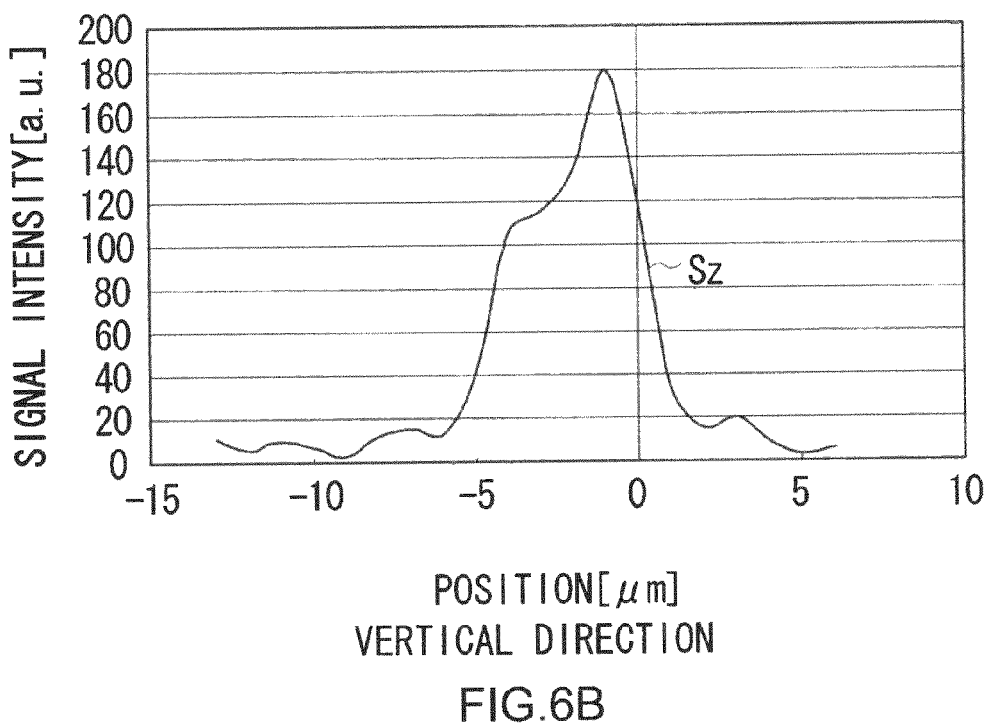
Figure 7A:
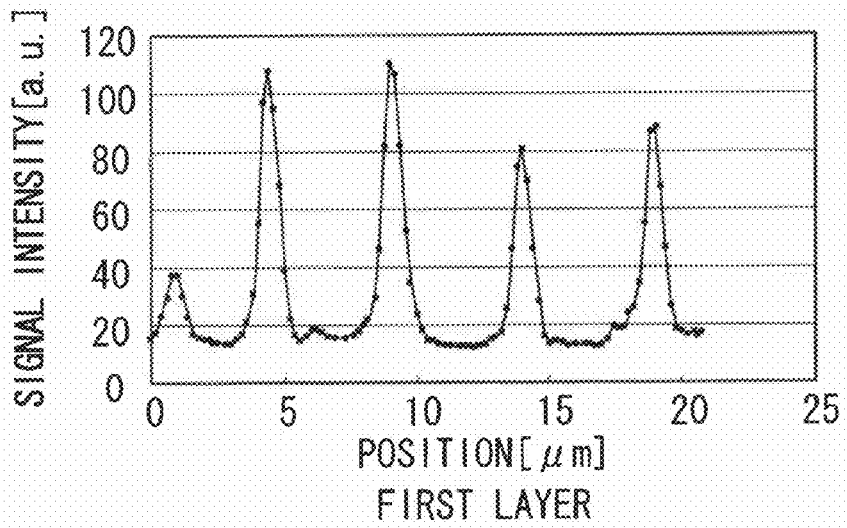
FIGS. 7A to 7C are schematic views indicative of the signal intensity distribution of the returned light beam in respective layers (1)
Figure 7B:
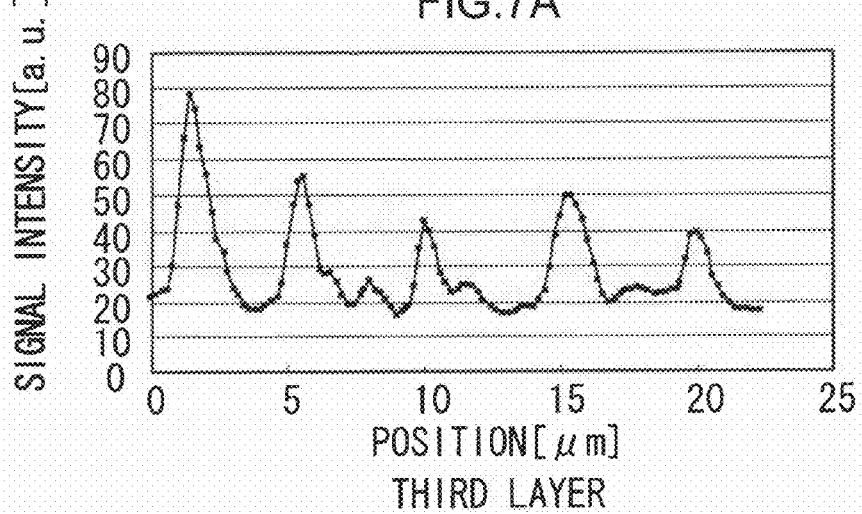
Figure 7C:
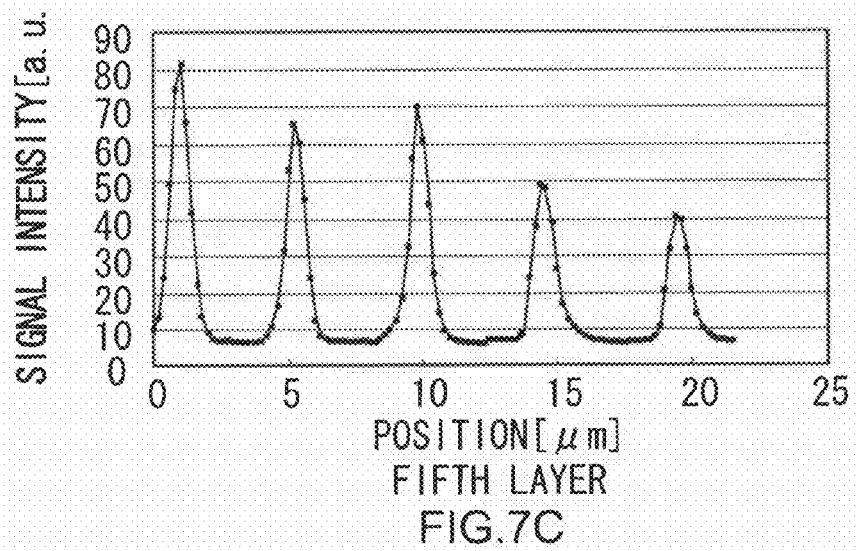
Figure 8A:
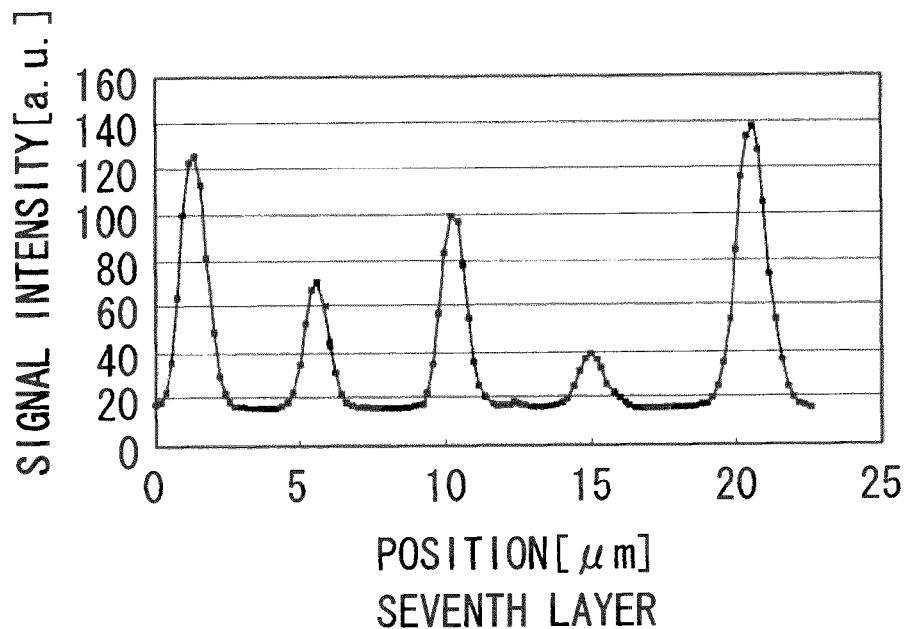
FIGS. 8A and 8B are schematic views indicative of the signal intensity distribution of the returned light beam in respective layers (2).
Figure 8B:
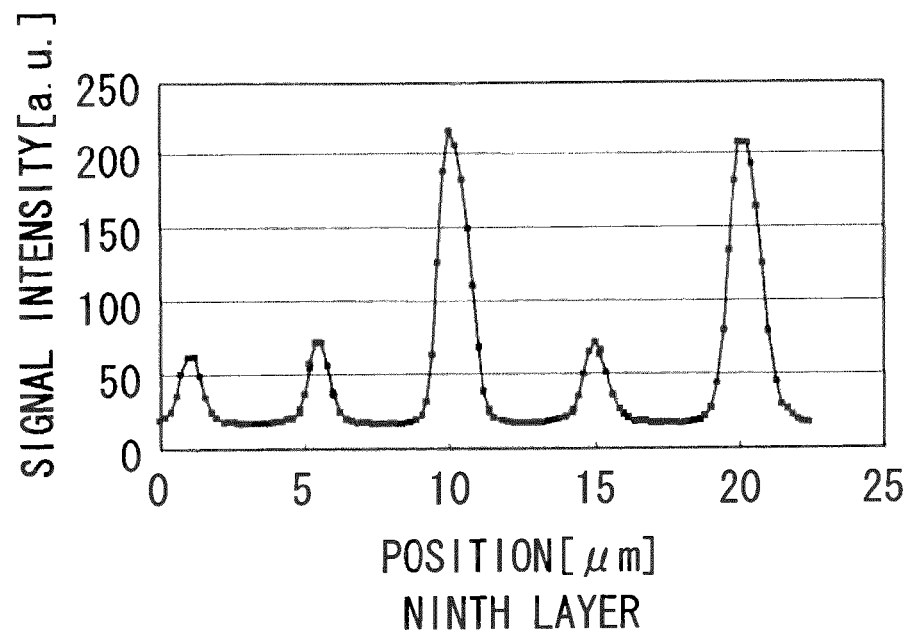

When measuring the distribution of the light intensity of the returned light beam L3, which is brought about when the reading light beam L2d is reflected by the recording mark RM, in the "x" direction, "y" direction, and "z" direction, results shown in FIGS. 6A and 6B are obtained. Characteristic curves "Sx", "Sy", and "Sz" show distributions of the signal intensity (or light intensity) obtained by the light receiving element 15 when shifting the focal point of the reading light beam L2d in the "x" direction, "y" direction, and "z" direction with the target position set to the center.

In this case, after initializing the optical information recording medium 100 whose recording layer 101 has its thickness "t1" set to 0.3 mm using a laser beam used in the case of FIG. 5A, a position located away from the boundary of the recording layer 101 and the base plate 102 by 0.1 mm in the "z" direction being the target position, the optical information recording and reproducing device 1 records the recording mark RM with the NA of the objective lens 13 set to 0.4, the wavelength of the recording light beam L2c set to 532 nm, the optical power set to 90 mW, and the recording time period set to 3 sec. Furthermore, the optical information recording and reproducing device 1 sets the wavelength of the reading light beam L2d to 532 nm, and sets the optical power to 7 µW.

From the distribution characteristics shown in FIGS. 6A and 6B, in general, it can be seen that the recording mark RM is roughly formed into an oval figure, and is approximately 1 µm in diameter in the "xy" plane and is approximately 10 µm in height in the "z" direction.

Actually, based on the signal intensity of the returned light beam L3, when detecting that the recording mark RM is recorded on the target position since the signal intensity is high, the optical information recording and reproducing device 1 recognizes that information recorded on the target position is "1", and when detecting that the recording mark RM is not recorded on the target position since the signal intensity is low, the optical information recording and reproducing device 1 recognizes that information recorded on the target position is "0", which makes it possible to read out information recorded on the optical information recording medium 100.

Part of the recording layer 101 where photopolymerization-type photopolymer is transubstantiated and the reflection factor is changed, that is, part to which the recording mark RM is to be formed locally exists around the focal point of the recording light beam L2c. Accordingly, in case the performance of the diffraction limit by the objective lens 13 is obtained, when the numerical aperture (NA) of the objective lens 13 is made larger, the optical information recording and reproducing device 1 can form the recording mark RM with a small size, which can improve the recording density of the recording layer 101.

On the other hand, empirically, in case a light emitting diode (LED) is used instead of a laser as the initialization light source 3, as shown in FIG. 5C, a comparatively weak returned light beam L3 can be detected. FIG. 5C shows the result of receiving light which is obtained by, in initializing the optical information recording medium 100, a green LED is used as the initialization light source 3, the optical power density is set to 2 mW/cm$^2$, and the initialization time period is set to 60 min, setting the recording light beam L2c and reading light beam L2d similarly as the case of FIG. 5B.

In this case, as is apparent from FIG. 5C, a result in which the intensity of the returned light beam L3 is weak and a signal to noise ratio (SNR) is bad is obtained.

There may be considered a technique in which the optical information recording and reproducing device 1 does not initialize the optical information recording medium 100, and in recording information, forms the recording mark RM by irradiating and condensing the recording light beam L2c to the target position to photopolymerize monomers to polymers, and increasing the temperature using the recording light beam L2c to transubstantiate the target position. On the other hand, since the recording condition is changed temporally and spatially, it is anticipated that stable information recording becomes difficult.

In this way, it can be confirmed that, in the optical information recording medium 100 according to the first embodiment, when the initialization processing using a laser beam is performed, the change in reflection factor is brought about most significantly at part where the recording light beam L2c is brought to a focus.

(1-3-4) Reproduction in Multilayer Recording

Next, with respect to the optical information recording medium 100 which is initialized similarly as the case of FIG. 5B, multilayer recording on which the recording marks RM are aligned in the three-dimensional directions (volumetric recording) is carried out by changing the position of the target position in the "z" direction stepwise, and the returned light beam L3 (that is, reproduced light) from the respective recording marks RM is measured.

Specifically, using the optical information recording and reproducing device 1, by changing the position of the optical pickup 5 in the "x" direction, "y" direction, and "z" direction to change the target position in the recording layer 101 in the three-dimensional directions, the recording marks RM are recorded in a layer over 10 layers. In this case, the interval between the recording marks RM in the "xy" plane in the respective layers (referred to as mark recording layer, respectively) is set to 5 µm, and the interval between the mark recording layers is set to 30 µm.

Next, using the optical information recording and reproducing device 1, the reading light beam L2d is so irradiated as to be brought to a focus on the respective mark recording layers of the optical information recording medium 100, and the returned light beam L3 is detected. The detection results of the returned light beam L3 in the first layer (side nearest to the base plate 102), third layer, fifth layer, seventh layer, and ninth layer are shown in FIGS. 7A to 7C, FIGS. 8A and 8B, respectively.

In FIGS. 7A to 7C, FIGS. 8A and 8B, the signal intensity is represented in the ordinate axis, and the position in the "x" direction is represented in the abscissa axis, and the measurement results of the signal intensity when shifting the focal point of the reading light beam L2d in the "x" direction in the respective mark recording layers are shown, respectively.

As is apparent from the FIGS. 7A to 7C, FIGS. 8A, and 8B, in all the mark recording layers from the first layer to the tenth layer in the optical information recording medium 100, the difference of the signal intensity between part where the recording mark RM is formed and part where the recording mark RM is not formed (part which is only initialized) is raised significantly.

That is, in the case of configuring the mark recording layers over at least 10 layers under the multilayer recording, the optical information recording and reproducing device 1 can obtain desired reproduced signals by detecting the recording marks RM recorded on the respective layers as the returned light beam L3 having a sufficiently necessary signal intensity, which makes it possible to detect whether or not the recording marks RM are present, that is, which of the value "0" or value "1" is recorded as information with high accuracy.

(1-4) Performance and Effect

In the above-described configuration, the optical information recording and reproducing device 1 according to the first embodiment, initializes the optical information recording medium 100 having the recording layer 101 made of photopolymerization-type photopolymer in advance by totally or partially irradiating the initialization light L1 thereto from the initialization light source 3.

Next, the optical information recording and reproducing device 1 condenses the recording light beam L2c having a comparatively strong light intensity to the target position in the recording layer 101 of the optical information recording medium 100 to record the recording mark RM, and then condenses the reading light beam L2d having a comparatively weak light intensity to the target position, and receives the returned light beam L3 having a sufficient light amount which is reflected by the recording mark RM.

Accordingly, by irradiating the initialization light L1 to initialize the recording layer 101 of the optical information recording medium 100 in advance, the optical information recording and reproducing device 1 can reliably record the recording mark RM, and correctly read out the recording mark RM.

In this case, by bringing about the photoreaction, i.e. photopolymerization reaction, the photocrosslinking reaction, or both of them, in the recording layer 101 made of photopolymerization-type photopolymer as the initialization processing, the optical information recording and reproducing device 1 can make the recording layer 101 suitable for forming the recording mark RM, that is, "surface preparation to record information" can be carried out.

Furthermore, by condensing the recording light beam L2c to the target position in the recording layer 101 to significantly increase the temperature near the target position, or keeping on irradiating the light in addition to increasing the temperature, the optical information recording and reproducing device 1 can transubstantiate photopolymerization-type photopolymer (FIG. 4). As a result, it becomes possible to form the recording mark RM of high reflection factor to record information.

Accordingly, when irradiating the reading light beam L2d to the optical information recording medium 100, the optical information recording and reproducing device 1 can detect the significantly strong returned light beam L3 from the recording mark RM as compared with part where the recording mark RM is not formed, that is, part which remains in the initialized state. In other words, the optical information recording and reproducing device 1 can obtain reproduced signals of significantly high SNR from the optical information recording medium 100, making it possible to reproduce information with accuracy and stably.

Furthermore, in case of configuring the mark recording layer with respect to the optical information recording medium 100 over multiple layers, the optical information recording and reproducing device 1 can obtain reproduced signals of sufficient SNR which enables to recognize clearly whether or not the recording marks RM are recorded from the respective layers (FIG. 7 and FIG. 8).

In this case, by shifting the focal point of the recording light beam L2c in the "z" direction (FIG. 1) stepwise, the optical information recording and reproducing device 1 can perform the volumetric recording under which the plural mark recording layers are configured in the recording layer 101. Accordingly, with respect to the recording layer 101 of the optical information recording medium 100, physical layers for recording marks do not have to be formed in advance, and photopolymerization-type photopolymer has to exist uniformly in the "z" direction (FIG. 2), which makes it possible to easily manufacture the optical information recording medium as compared with a case in which a recording layer configured by resin and reflection coat to which signals are transcribed from a metallic stamper is physically layered.

In general, when recording the positive type "μ" holograms, an optical information recording and reproducing device which forms holograms in photopolymerization-type photopolymer does not perform the initialization processing, and, by locally forming interference fringes of light on part (that is, target position) characterized in that information is to be recorded, brings about the photoreaction only at part of the interference fringes where the light intensity is strong, and records the interference fringes as holograms.

In case of the positive type "μ" holograms, when reproducing information, since reproduced light is returned from the holograms when irradiating reading light, and reproduced light is not raised from the other part, an optical information recording and reproducing device can recognize which of the value "0" or value "1" is recorded as information.

Furthermore, in case of the negative type "μ" holograms, an optical information recording and reproducing device forms interference fringes of light over the entire information recording area in photopolymerization-type photopolymer, and records the interference fringes to perform the initialization processing, and then, by locally condensing light to part (that is, target position) characterized in that information is to be recorded, increases the temperature of photopolymerization-type photopolymer at the target position and transubstantiate the part to locally damage the holograms.

In case of the negative type "μ" holograms, when reproducing information, since reproduced light is returned from the holograms when irradiating reading light, and reproduced light is scarcely returned from the part where the holograms are damaged, an optical information recording and reproducing device can recognize which of the value "0" or value "1" is recorded as information.

On the other hand, in the optical information recording and reproducing device 1, as compared with the case of using holograms, a significantly high-accuracy servocontrol to correctly generate interference fringes of light becomes unnecessary, making the configuration simplified. Furthermore, in case of using holograms, so as to correctly discriminate the value "0" or value "1" of information, it is necessary to adjust the sensitivity with respect to light in the optical information recording medium with high accuracy. On the other hand, in case of the present invention, this adjustment becomes unnecessary, making it comparatively easy to manufacture the optical information recording medium 100.

The manner of recording and reproducing information according to the present invention is definitely different from that employing the positive type "μ" holograms in the point of performing the initialization processing with respect to the optical information recording medium, which is advantageous as compared with the case of employing the positive type "μ" holograms in the point that high-accuracy servocontrol becomes unnecessary and the configuration can be simplified.

Furthermore, when compared with the negative type "μ" holograms, the present invention is largely different in the point that the photoreaction is uniformly brought about, that is, the precure is performed, and the point that reproduced light is not returned but that intense reproduced light is returned from part to which recording light is irradiated to record information. Especially, the present invention is advantageous as compared with the case of employing the negative type "μ" holograms in the point that holograms which require advanced control etc. do not have to be formed at the time of the initialization processing, and the point that light of different wavelength can be used at the time of the initialization processing and at the time of the recording and reproducing processing.

For example, in case of using a green laser, a blue laser, etc. which irradiate a laser beam whose wavelength is similar to that of the recording light beam L2c and reading light beam L2d as the initialization light source 3, in general, since high output is difficult, the possibility is high that a long time period is required in initializing a large area. On the other hand, in the optical information recording and reproducing device 1 according to the present invention, in a wavelength range under which the recording layer 101 is reacted, since a laser capable of high outputting can be used as the initialization light source 3, a large area can be initialized in a comparatively short time period.

On the other hand, there has been suggested a technique of carrying out the volumetric recording utilizing the two photon absorption, under which a recording medium to which information can be stably recorded is under development, and a single pulse high power laser such as a femtosecond laser undesirably is necessary, raising a problem that the configuration of an optical information recording and reproducing device is complicated.

On the other hand, using a semiconductor laser etc., the optical information recording and reproducing device 1 according to the present invention may be of the configuration similar to that of a general optical disc device without being complicated, and the processing of recording and reproducing the recording mark RM stably using the optical information recording medium 100 can be actually confirmed.

Furthermore, in recording information using the volume holograms, there are raised problems that it is difficult to suppress the generation of media noise when the multilayer recording is advanced, and that it is difficult to handle photopolymer media (recording media) mainly used, and that the configuration of an optical information recording and reproducing device becomes complicated since a spatial modulation device, an image sensor, etc. composed of multiple pixels have to be used. On the other hand, according to the optical information recording and reproducing device 1 of the present invention, these problems are not raised in principle.

According to the above-described configuration, by carrying out the initialization processing with respect to the optical information recording medium 100 having the recording layer 101 made of photopolymerization-type photopolymer in advance, condensing the recording light beam L2c having a comparatively intense light intensity to the target position in the recording layer 101 and increasing the temperature thereof to record the recording mark RM, then condensing the reading light beam L2d having a comparatively weak light intensity to the target position, and receiving the returned light beam L3 having a sufficient light amount reflected by the recording mark RM, the optical information recording and reproducing device 1 according to the first embodiment can surely record the recording mark RM, and can stably read out the recording mark RM.

Figure 9:
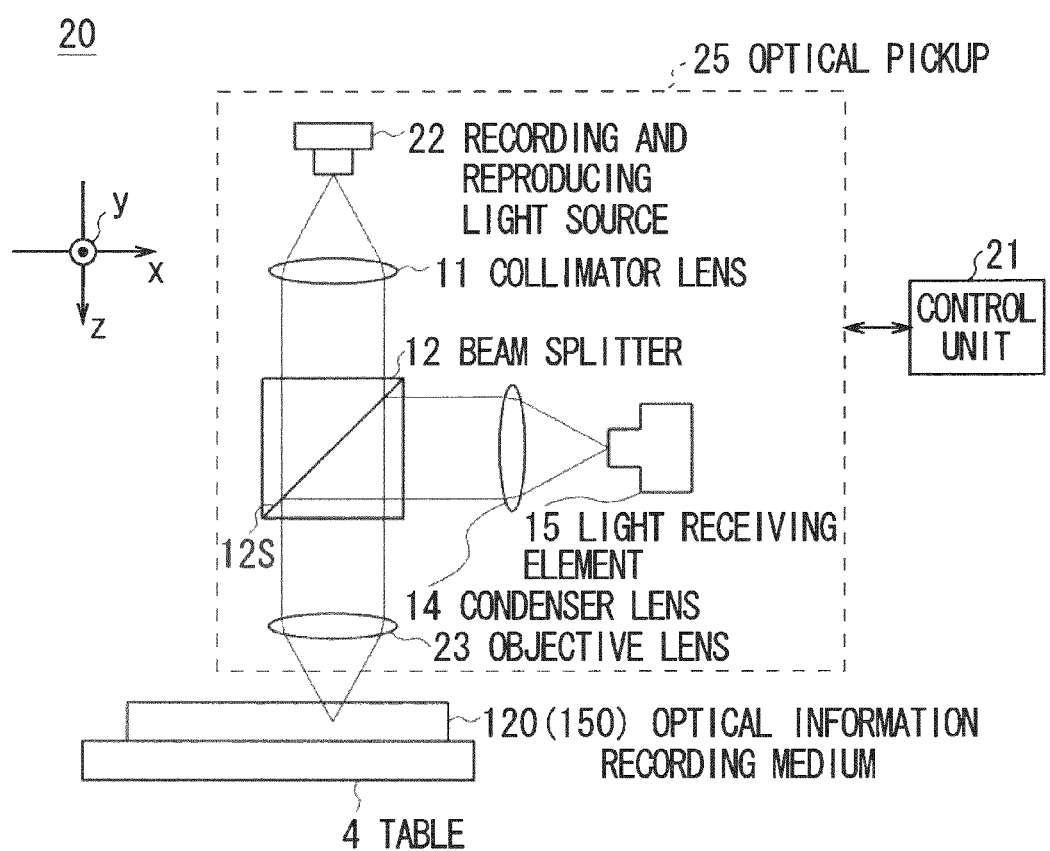
FIG. 9 is a schematic view indicative of the configuration of an optical information recording and reproducing device according to a second embodiment of the present invention.

(2) Second Embodiment (2-1) Configuration of Optical Information Recording and Reproducing Device As shown in FIG. 9 whose parts have been designated by the same reference symbols and marks as the corresponding parts of FIG. 1, an optical information recording and reproducing device 20 according to a second embodiment, is totally controlled by a control unit 21 corresponding to the control unit 2 (FIG. 1).

Furthermore, the optical information recording and reproducing device 20 has almost the same configuration as that of the optical information recording and reproducing device 1 (FIG. 1). Instead of the optical pickup 5 having a recording and reproducing light source 10 and the objective lens 13, the optical information recording and reproducing device 20 includes an optical pickup 25 having a recording and reproducing light source 22 and an objective lens 23 and excludes the initialization light source 3.

(2-2) Configuration of Optical Information Recording Medium

Figure 10A:
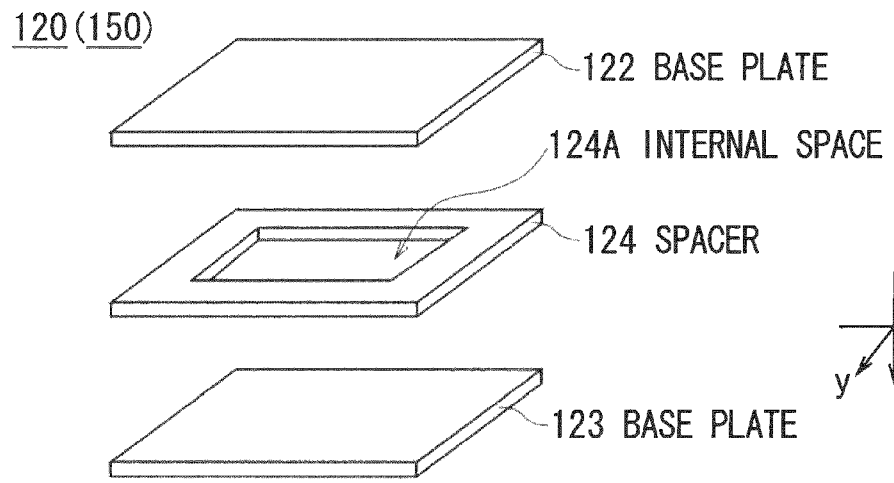
FIGS. 10A to 10C are schematic views indicative of the configuration of an optical information recording medium according to a second embodiment of the present invention.
Figure 10B:
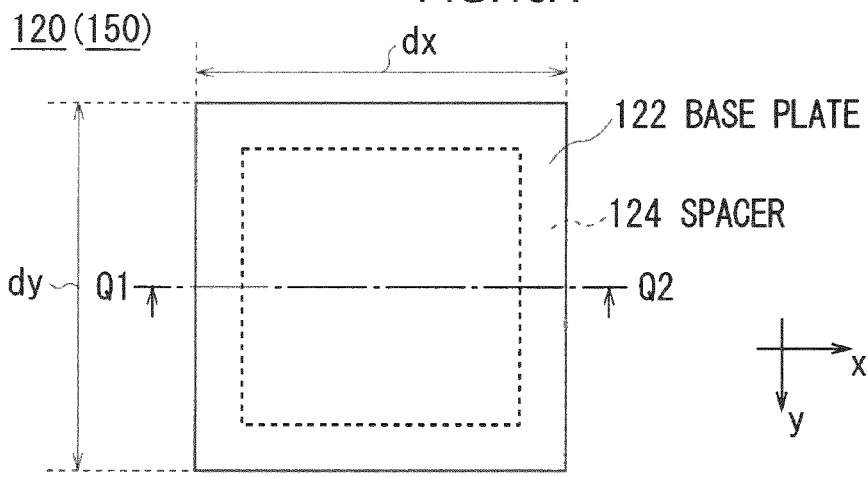
Figure 10C:
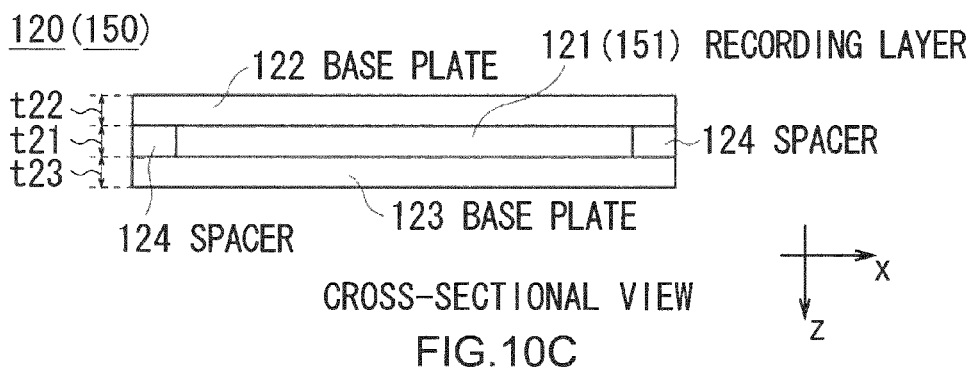

On the other hand, in the second embodiment, instead of the optical information recording medium 100, an optical information recording medium 120 is used. This optical information recording medium 120, as shown in FIGS. 10A to 10C, sandwiches in a spacer 124 between base plates 122 and 123. As a result, a recording layer 121 is formed in an internal space 124A in the spacer 124. Therefore, the optical information recording medium 120 serves as photopolymer media as a whole.

Base plates 122 and 123 are formed by a glass plate as well as the base plates 102 and 103 in the first embodiment, which can make light transmit therethorough at a high rate. Each of the base plates 122 and 123 is in the form of a square plate or a rectangle plate respectively, which has its length "dx" in the "x" direction and length "dy" in the "y" direction set approximately to 30 to 80 mm respectively, and has the thickness "t22" or "t23" in the "z" direction set approximately to 1.1 mm.

The spacer 124 is formed by a polyethylene terephthalate (PET) resin, which has its length "dx" in the "x" direction and length "dy" in the "y" direction set approximately to 30 to 80 mm respectively in accordance with the base plates 122 and 123, and has the thickness "t21" in the "z" direction set approximately to 0.5 mm. Moreover, the spacer 124, as shown in FIG. 10A, has the internal space 124A in which the section of rectangular shape is bored through to the "z" direction, in other words, cored in the shape of a rectangular parallelepiped In an initialization device 80 shown in FIG. 11, the recording layer 121, on which a liquid material M1 to be described later is dispersed in the internal space 124A sandwiching in the spacer 124 between the base plates 122 and 123, is initialized by an initialization light L21 irradiated from an initialization light source 81. Note that, for the initialization light source 81, it is possible to use a source which can radiate sufficient optical power such as a high pressure mercury lamp, a high-pressure metal halide lamp, a solid-state laser, or a semiconductor laser, as well as the initialization light source 3.

In the recording layer 121, a photoreactive resin including organometal or inorganic metal compound is dispersed uniformly. When light is irradiated at the state before initialization, photopolymerization reaction, the photocrosslinking reaction, or both reaction of photoreactive resin in the recording layer 121 is carried out (i.e., photoreaction) at the part to which the light is irradiated. As a result, a molecular weight is increased; the recording layer 121 is hardened; and the refractive index is changed (referred to as photoreactivity, hereinafter).

Specifically, the recording layer 121 is organometal compound made of acrylic acid ester monomer (p-cumylphenol ethyleneoxide addition acrylic acid ester) and urethane bifunctional acrylate olygomer (weight ratio: 40:50) whose weight ratio with respect to the monomer and olygomer is 2%, wherein bis (η-2,4-cyclopentadiene-1-yl)-bis(2,6-difluoro-3-(1H-pyrrole-1-yl)-phenyl) titanium (Chiba specialty chemicals IRGACTURE [trademark]-784, referred to as Irg-784) is mixed and defoamed under a dark room (referred to as liquid material M1, hereinafter), dispersed in the internal space 124A in the spacer 124 sandwiching between the base plates 122 and 123, and irradiated by the initialization light L21 (wavelength: 365 nm, power density: 30 mW/cm$^2$) from the initialization light source 81 which is a high pressure mercury lamp for 60 min. Accordingly, the recording layer 121 is optically hardened.

In this initialization processing, in the entire recording layer 121, since the photoreaction is brought about totally in a similar way to the initialization processing (precure) in the first embodiment, the photoreaction of the resin therein is brought about. As a result, the recording layer 121 is formed in a shape of a thin square plate or a thin rectangle plate based on the form of the internal space 124A.

Accordingly, the refractive index of the recording layer 121 is totally changed compared to before irradiating by initialization light. Note that the recording layer 121 is almost transparent when optically hardened and can transmit the irradiated light at a high rate.

The optical information recording medium 120 is formed into a thin plate as a whole, transmits most light in which the resin in the recording layer 121 reacts photopolymerization, the photocrosslinking, or both of them through the initialization processing, and includes a little amount of organometal compound in the recording layer 121.

(2-3) Recording and Reproduction of Information

Next, the manner of recording information to the optical information recording medium 120, and the manner of reproducing information from the optical information recording medium 120 in the second embodiment will be explained.

Figure 12A:
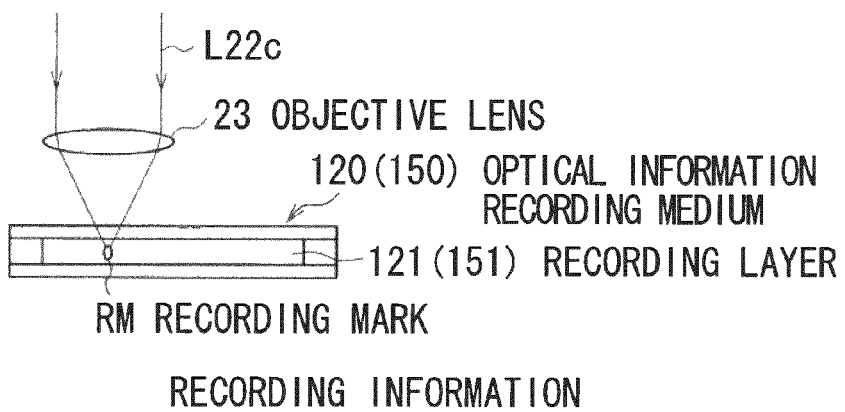
FIGS. 12A and 12B are schematic views to explain recording and reproducing information according to a second embodiment of the present invention.

When recording information to the optical information recording medium 120, as shown in FIG. 12A, the optical information recording and reproducing device 20 condenses a recording light beam L22c from the recording and reproducing light source 22 shown in FIG. 9, to the inside of the recording layer 121. In this case, the optical information recording and reproducing device 20 controls the position in the "x" direction, "y" direction, and "z" direction of the optical pickup 25 shown in FIG. 9, and brings the recording light beam L22c shown in FIG. 12A to a focus on a position which is targeted (i.e., target position) in the recording layer 121.

Specifically, the optical information recording and reproducing device 20, in which the target position is set to 100 μm deep from the surface of the recording layer 121, emits the recording light L22c consisting of a laser beam whose wavelength is set to 402 nm and the optical power is set to 20 mW from the recording and reproducing light source 22, condenses this by an objective lens 23 whose numerical aperture (NA) is set to 0.35, and irradiates to the target position for 1 sec as an irradiating time.

Figure 12B:
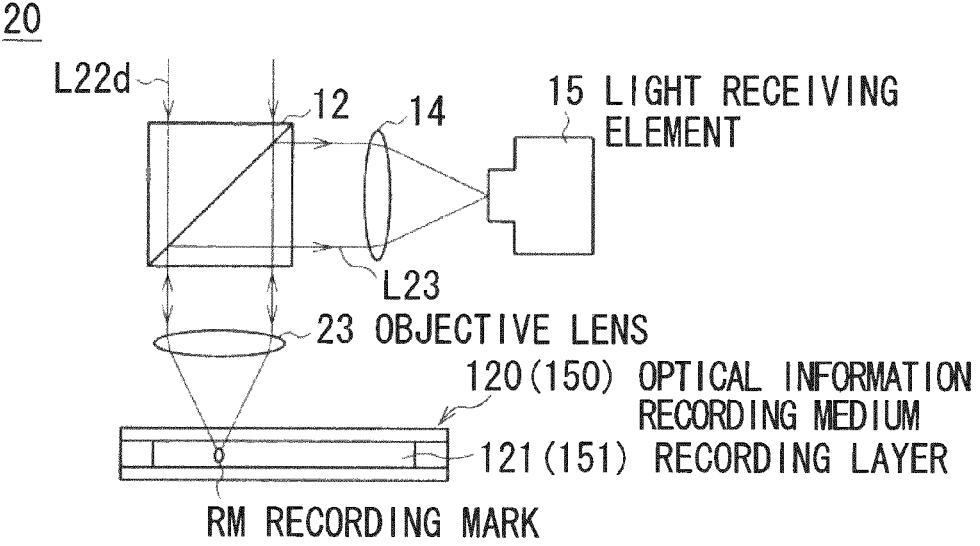

As shown in FIG. 12B, the optical information recording and reproducing device 20, at a time reproducing information, emits reading light beam L22d whose wavelength is the same as recording light beam L22c from recording and reproducing light source 22 and its optical power is set to 200 μW, and condenses to a recording mark RM in the recording layer 121 by means of the objective lens 23.

At this time, reading light beam L22d is reflected by the recording mark RM and becomes a returned light beam L23. The optical information recording and reproducing device 20 detects the returned light beam L23 through the objective lens 23, a beam splitter 12, and the like by means of a light receiving element 15 of a charge coupled device (CCD).

Figure 13A:
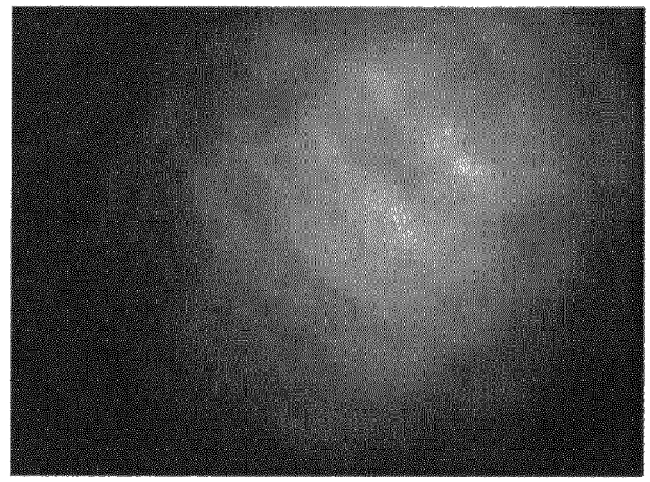
FIGS. 13A and 13B are schematic views indicative of the state of receiving a returned light beam according to a second embodiment of the present invention.

As shown in FIG. 13A, the light receiving element 15 can detect the returned light beam L23 having high intensity similar to the first embodiment shown in FIG. 5A.

It is considered that the temperature near the target position in the recording layer 121 is increased locally by condensing of recording light beam L22c, therefore, a cavity is formed by the thermochemical reaction or both the thermochemical reaction and optical reaction of the organometalic compound.

It is also considered that, in the recording layer 121, the cavity is formed in the part where the temperature is increased locally by condensing of the recording light beam L22c in the resin containing organometalic compound, and then the reflection factor is increased by the difference of the refractive index between the materials of the recording layer 121 and the cavity.

Figure 14:
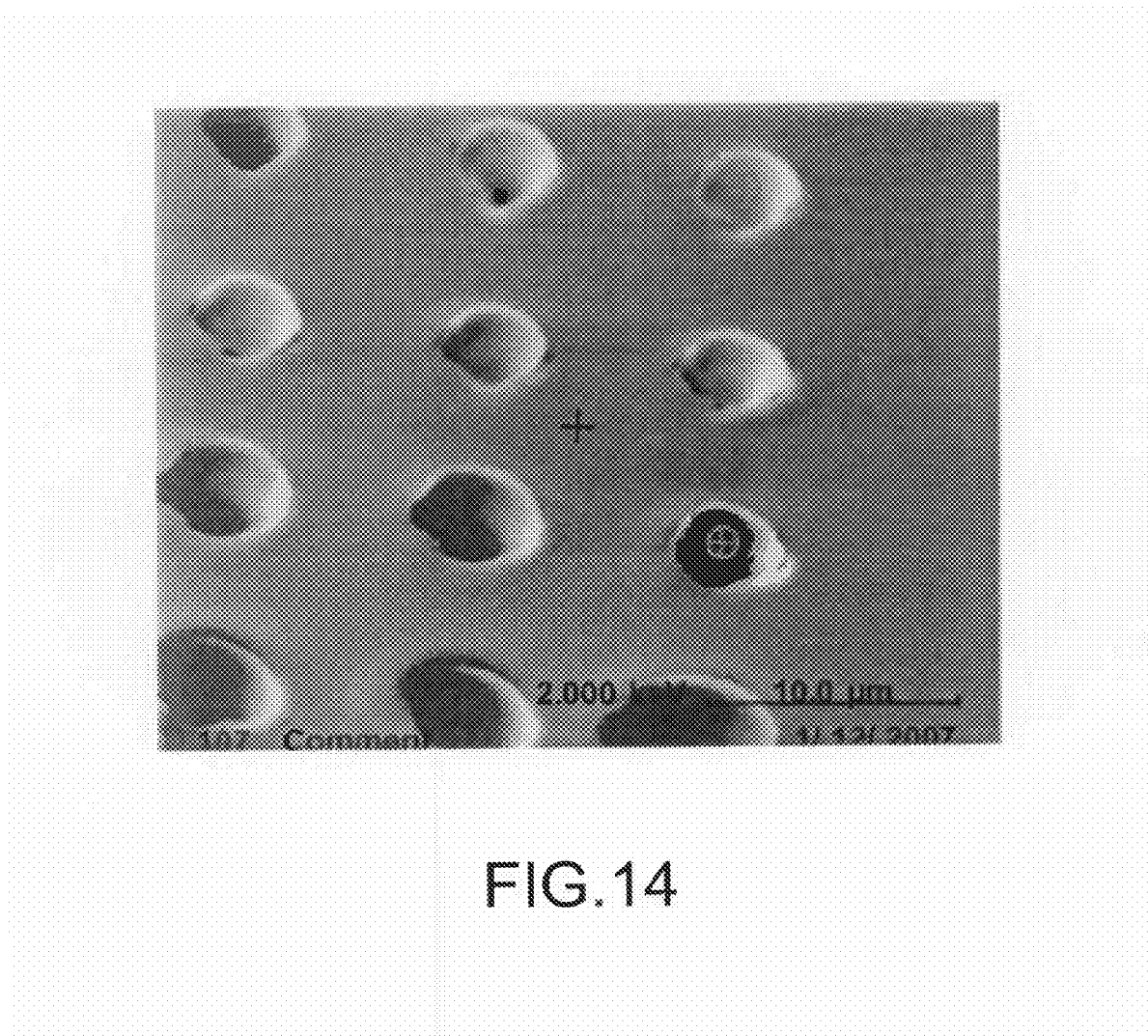
FIG. 14 is a cross-sectional SEM image of a recording mark.
Figure 15A:
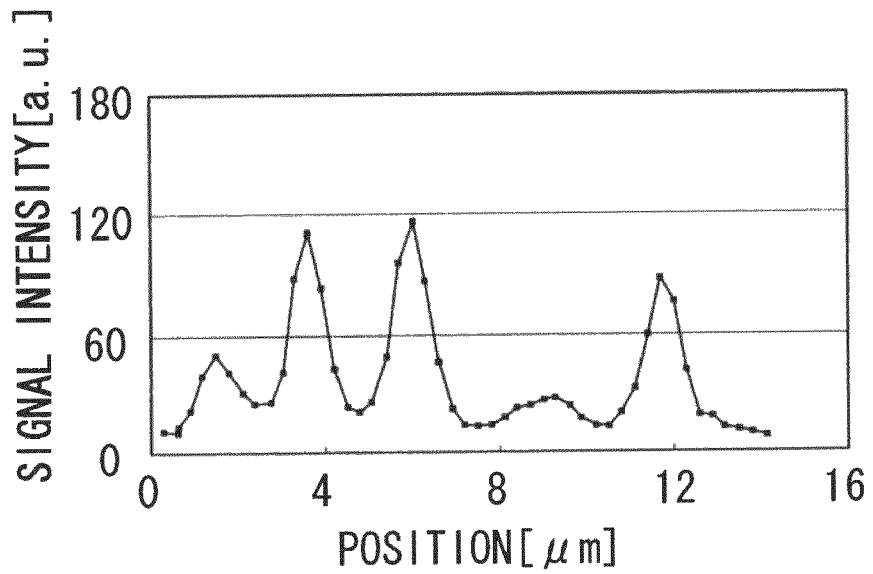
FIGS. 15A and 15B are schematic views indicative of the signal intensity distribution of the returned light beam in respective layers (1) according to a second embodiment of the present invention.
Figure 15B:
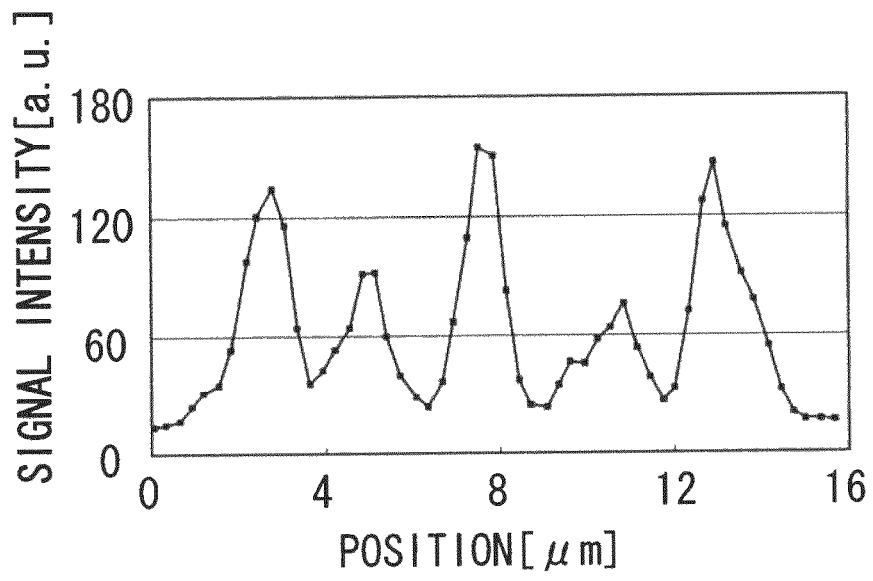
Figure 16A:
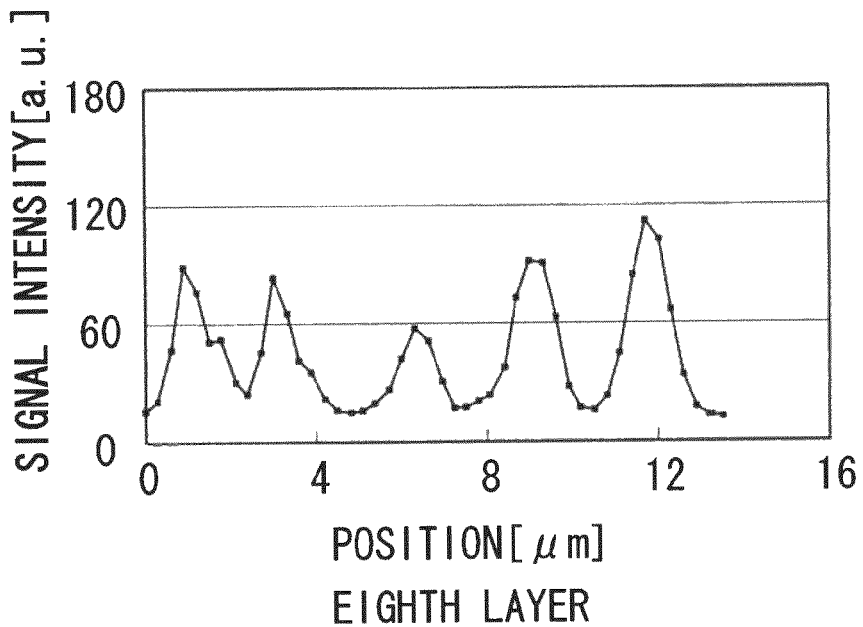
FIGS. 16A and 16B are schematic views indicative of the signal intensity distribution of the returned light beam in respective layers (2) according to a second embodiment of the present invention.
Figure 16B:
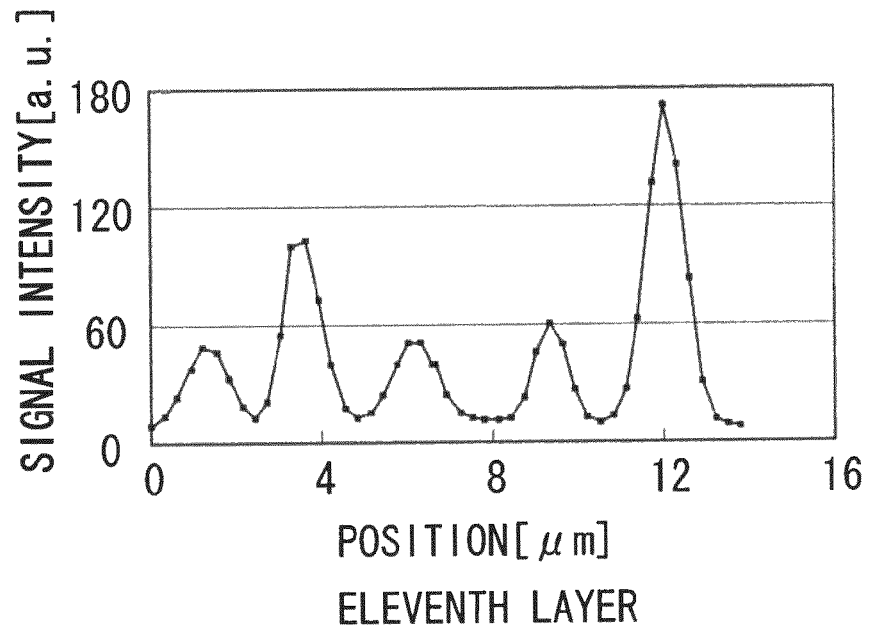

FIG. 14 shows a scanning electron microscope (SEM) image which indicates a cross section of plurally formed recording marks RM in the recording layer 121. In FIG. 14, it turns out that the recording mark RM is a cavity in a shape of sphere or near spheroidicity.

Moreover, it is assumed that the boundary face of each recording marks RM has an uncurved surface, therefore, the refractive index may be changed steeply. As a result, the boundary face may have high reflective factor.

In this manner, near the target position in the recording layer 121, the recording mark RM which is the cavity is formed, and information is recorded. Note that it is difficult to confirm the recording mark RM visually.

Figure 13B:
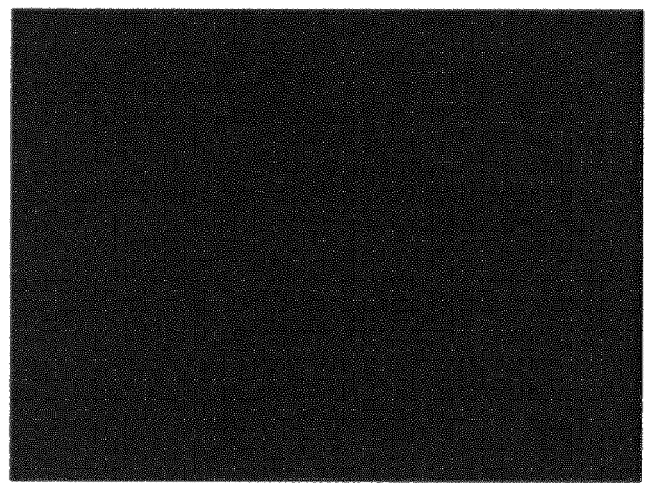

On the other hand, as shown in FIG. 13B, an imperceptible returned light beam L23 is detected from a part where the recording light RM was not recorded (i.e. unrecorded part): when reproducing information from the optical information recording medium 120, in the same way as the first embodiment, a detected intensity of the returned light beam L23 of the optical information recording and reproducing device 20 is largely changed according to whether or not the recording mark RM is present.

This shows that, for example, the optical information recording and reproducing device 20 can record information to the optical information recording medium 120 by making the code "0" or "1" correspond to the whether or not the recording mark RM is present, and, when reproducing the information, can detect whether or not the recording marks RM are recorded on the target position at that time, that is, which of the code "0" or "1" is recorded as information with high accuracy.

In this manner, by condensing the recording light beam L22c by the optical information recording and reproducing device 20 with respect to the recording layer 121 which contains organometalic compound and is optically hardened in advance, and increasing the temperature, the optical information recording medium 120 can execute recording information of which the recording mark RM of a cavity is formed. Moreover, since the reading light beam L22d is irradiated to the recording mark RM by the optical information recording and reproducing device 20, the optical information recording medium 120 can execute reproducing information of which the returned light beam L23 having high luminance is detected.

(2-4) Reproduction in Multilayer Recording

Next, with respect to the optical information recording medium 120 similarly as the case of the first embodiment, multilayer recording on which the recording marks RM of a cavity are aligned in the three-dimensional directions (volumetric recording) is carried out by changing the position of the target position in the "z" direction stepwise, and the returned light beam L23 (that is, reproduced light) from the respective recording marks RM is measured.

Specifically, using the optical information recording and reproducing device 20, by changing the position of the optical pickup 25 in the "x" direction, "y" direction, and "z" direction to change the target position in the recording layer 121 in the three-dimensional directions, the recording marks RM are recorded in a layer over 12 layers. In this case, the interval between the recording marks RM in the "xy" plane in the mark recording layers is set to 3 μm, and the interval between the mark recording layers is set to 22.5 μm.

Next, using the optical information recording and reproducing device 20, the reading light beam L22d is so irradiated as to be brought to a focus on the respective mark recording layers of the optical information recording medium 120, and the returned light beam L23 is detected. Specifically, the wavelengths of the recording light beam L22c and reading light beam L22d used for recording and reproducing of information to the optical information recording medium 120 are set to 405 nm; the optical power of the recording light beam L22c is set to 10 mW; the recording time period is set to 2 to 5 sec; the optical power of the reading light beam L22d is set to 1 mW; and the NA of the objective lens 23 is set to 0.35.

The detection results of the returned light beam L23 in the second layer (side nearest to the base plate 102), fifth layer, eighth layer, and eleventh layer are shown in FIGS. 15A and 15B, and FIGS. 16A and 16B, respectively.

In FIGS. 15A and 15B, and FIGS. 16A and 16B, similar to FIGS. 7 and 8, the signal intensity is represented in the ordinate axis, and the position in the "x" direction is represented in the abscissa axis, and the measurement results of the signal intensity when shifting the focal point of the reading light beam L22d in the "x" direction in the respective mark recording layers are shown, respectively.

As is apparent from FIGS. 15A and 15B, and FIGS. 16A and 16B, in all the mark recording layers from the first layer to the twelfth layer in the optical information recording medium 120, the difference of the signal intensity between part where the recording mark RM is formed and part where the recording mark RM is not formed (part which is only initialized) is raised significantly.

That is, in the case of configuring the mark recording layers over at least 12 layers by the optical information recording and reproducing device 20, the optical information recording medium 120 can obtain desired reproduced signals by detecting the recording marks RM recorded on the respective layers as the returned light beam L23 having a sufficiently necessary signal intensity, which makes it possible to detect whether or not the recording marks RM are present, that is, which of the value "0" or value "1" is recorded as information with high accuracy.

(2-5) Performance and Effect

In the above-described configuration, the optical information recording and reproducing device 20 according to the second embodiment, forms a cavity near the target position in the recording layer 121 in the optical information recording medium 120 which contains organometalic compound and is optically hardened in advance, by condensing the recording light beam L22c emitted from the recording and reproducing light source 22 to the target position and increasing the temperature, improves the refractive index, and forms the recording mark RM.

Moreover, the optical information recording and reproducing device 20 condenses the reading light beam L22d having a comparatively weak light intensity to the recording mark RM in the recording layer 121, and then receives the returned light beam L23 having a strong light intensity which is reflected by the recording mark RM.

Accordingly, since the recording layer 121 is optically hardened in advance, the optical information recording medium 120 can form the recording mark RM in the state where photoreaction have been completed previously.

Furthermore, since the resin which constitutes the recording layer 121 contains organometalic compound, the optical information recording medium 120 can keep the reflection factor of light low at the part where still initializing, and can form the recording mark RM of high reflection factor by condensing the recording light beam L22c, increasing temperature locally, causing transubstantiation of the resin, and forming the cavity.

At this time, since the photoreaction in the recording layer 121 has been completed, the optical information recording medium 120 can increase the temperature near the target position reliably without causing a change of photoreaction rate or a change of thermal conductivity derived from occurrence of a photon mode.

In this manner, the optical information recording medium 120 can make the temperature near the target position in the recording layer 121 above the boiling point of the resin which constitutes the recording layer 121, to generate a cavity and to form the recording mark RM reliably.

Accordingly, when irradiating the reading light beam L22d from the optical information recording and reproducing device 20 at the time of reproducing information, the optical information recording medium 120 can detect the significantly strong returned light beam L23 from the part where the recording mark RM is formed as compared with part where the recording mark RM is not formed. In other words, the optical information recording medium 120, similar to the optical information recording medium 100 according to the first embodiment, can generate reproduced signals of significantly high SNR by the optical information recording and reproducing device 20, making it possible to reproduce information with accuracy and stably.

Moreover, as shown in FIGS. 15A and 15B, and FIGS. 16A and 16B, the optical information recording medium 120 can make the optical information recording and reproducing device 20 retrieve whether or not the recording mark RM recorded in each layer is present at high accuracy even in the case of multilayer-recording over at least 12 layers In so-called positive type "μ" holograms recording and reproducing device that records information by making two types of light beams interfere with each other to form minute holograms in a recording medium, due to complication of its configuration, there are large limitation especially on the temperature and humidity environment when recording and reproducing. Therefore, there is restriction of not equating with CD media, DVD media, or BD media which have been already in widespread. On the other hand, in the optical information recording medium 120 according to the present invention, the configuration of the optical information recording and reproducing device 20 is dramatically simplified compared to thus configured optical disc device, which can drastically reduce the restriction at the time of recording and reproducing, and is possible to record and reproduce information stably.

In the above-described configuration, the optical information recording medium 120 according to the second embodiment can form a cavity near the target position in the recording layer 121 in the optical information recording medium 120 which contains organometalic compound and is optically hardened in advance, by condensing the recording light beam L22c to the target position and increasing the temperature by optical information recording and reproducing device 20, and form the recording mark RM improved the refractive index, and can retrieve information represented whether or not the recording mark RM is present stably by detecting the returned light beam L23 having sufficient light amount reflected off the recording mark RM.

Figure 17:
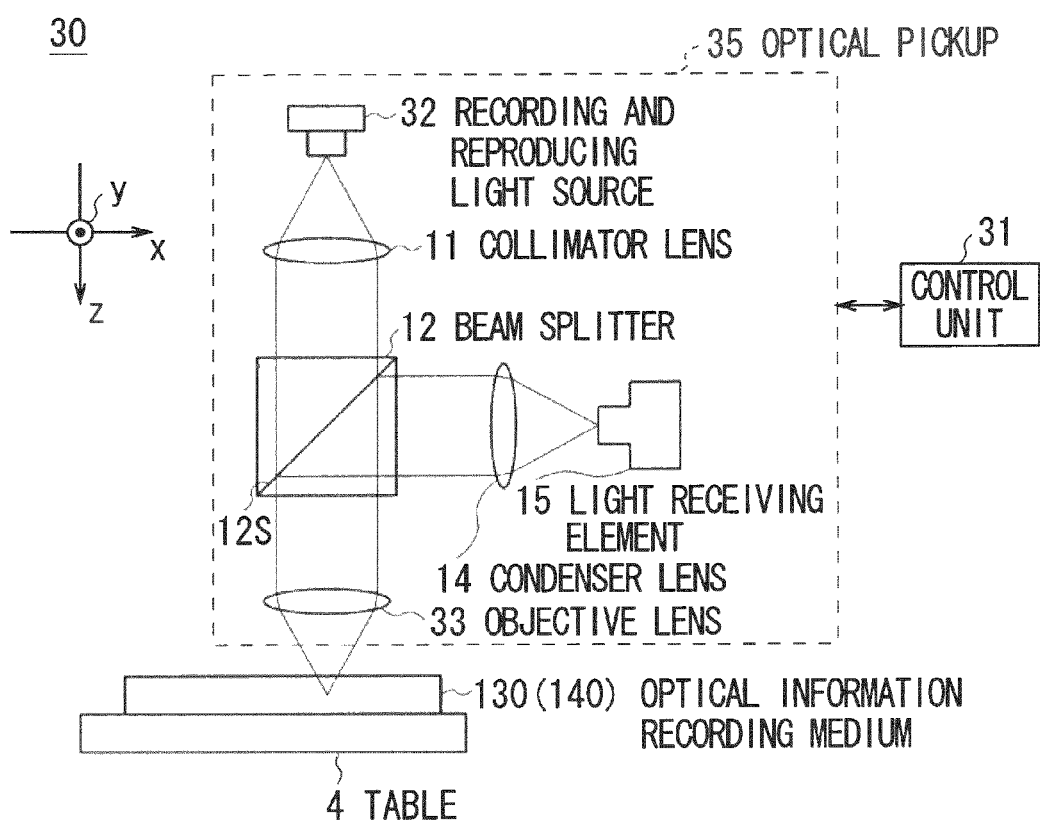
FIG. 17 is a schematic view indicative of the configuration of an optical information recording and reproducing device according to a third embodiment of the present invention.

(3) Third Embodiment (3-1) Configuration of Optical Information Recording and Reproducing Device As shown in FIG. 17 whose parts have been designated by the same reference symbols and marks as the corresponding parts of FIG. 1, an optical information recording and reproducing device 30 according to a third embodiment, is totally controlled by a control unit 31 corresponding to the control unit 2 (FIG. 1).

Furthermore, the optical information recording and reproducing device 30 has almost the same configuration as that of the optical information recording and reproducing device 1 (FIG. 1). Instead of the optical pickup 5 having the recording and reproducing light source 10 and the objective lens 13, the optical information recording and reproducing device 30 includes an optical pickup 35 having a recording and reproducing light source 32 and an objective lens 33 and excludes the initialization light source 3.

(3-2) Configuration of Optical Information Recording Medium

Figure 18A:
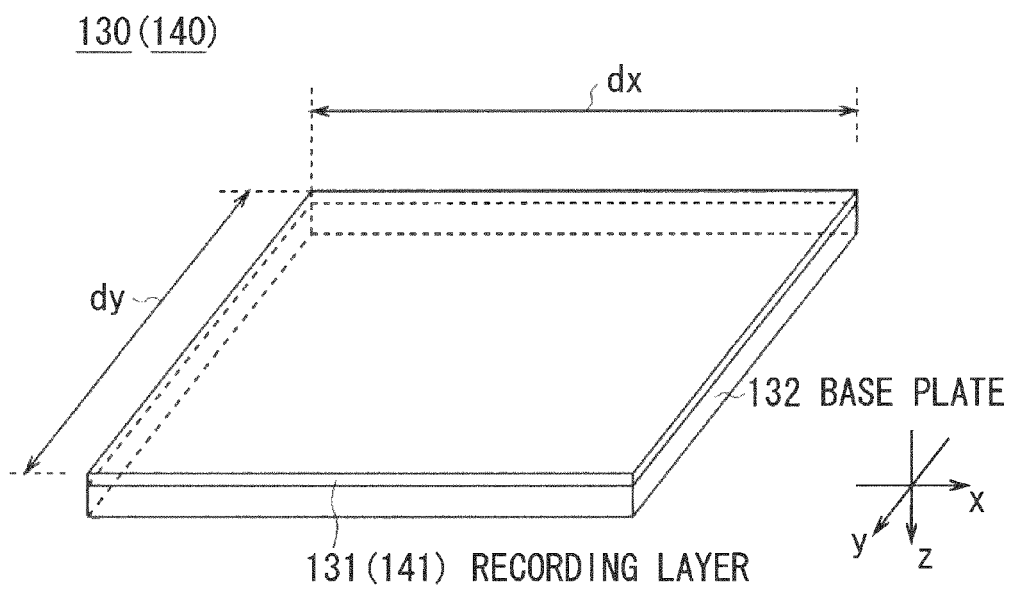
FIGS. 18A and 18B are schematic views indicative of the configuration of an optical information recording medium according to a third embodiment of the present invention.
Figure 18B:
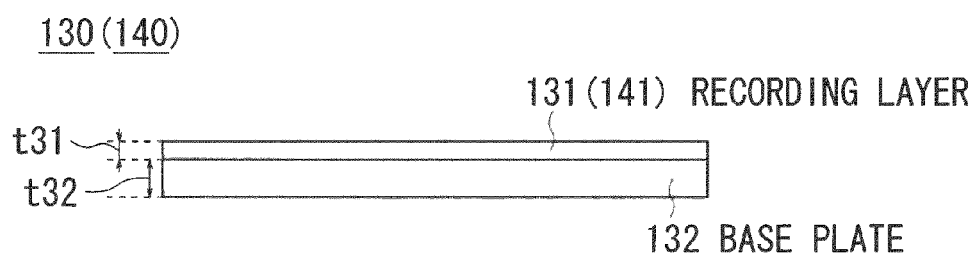

In the third embodiment, instead of the optical information recording medium 100, an optical information recording medium 130 is used. The optical information recording medium 130, as shown in FIGS. 18A and 18B, provides a recording layer 131 on a base plate 132 and serves as photopolymer media as a whole.

A base plate 132 is formed by a glass plate similar to the base plates 102 and 103 in the first embodiment, which can make light transmit therethorough at a high rate, and is in the form of a square plate or a rectangle plate, which has its length "dx" in the "x" direction and length "dy" in the "y" direction set approximately to 30 to 80 mm respectively, and has the thickness "t32" in the "z" direction set approximately to 0.6 mm.

At the fabrication stage, a liquid material M2 to be referred later is dispersed on the base plate 132. By means of an initialization device 80 shown in FIG. 11 similar to the second embodiment, the recording layer 131 is initialized by an initialization light L31 emitted from an initialization light source 81

Specifically, the recording layer 131 made by mixing Irg-784 as organometalic compound, in weight ratio of 1% into a ultraviolet-curable resin (Sony chemical 06A32X-5) and defoaming in a dark room (to be referred to as liquid material M2, hereinafter), which is then dispersed in a manner whose thickness "t31" is to be 500 μm on the base plate 132, and is optically hardened by irradiating L31 (wavelength: 365 nm, power density: 300 mW/cm$^2$) for 20 sec from the initialization light source 81 of high pressure mercury lamp.

In this initialization processing, in the entire recording layer 131, since the photoreaction is brought about totally in a similar way to the initialization processing (precure) in the first embodiment, the photopolymerization reaction or the photocrosslinking reaction, or both reaction of the resin is brought about internally. As a result, the refractive index of the recording layer 131 is totally changed compared to before irradiating by initialization light. Note that the recording layer 131 is almost transparent when optically hardened and can transmit the irradiated light at a high rate.

Similar to the optical information recording medium 120 in the second embodiment, the optical information recording medium 130 is formed into a thin plate as a whole, transmits most light in which the resin in the recording layer 131 photoreacts, and includes a little amount of organometal compound in the recording layer 131.

(3-3) Recording and Reproduction of Information

Next, the manner of recording information to the optical information recording medium 130, and the manner of reproducing information from the optical information recording medium 130 in the third embodiment will be explained.

Figure 19A:
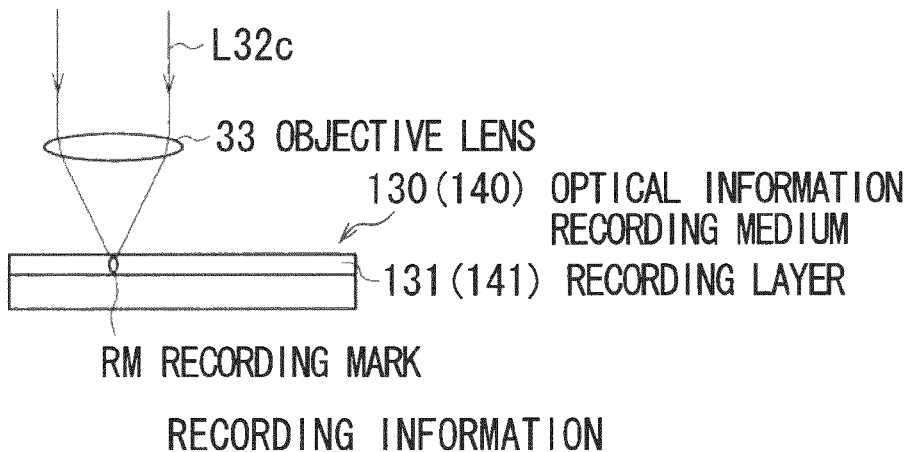
FIGS. 19A and 19B are schematic views to explain recording and reproducing information according to a third embodiment of the present invention.
Figure 19B:
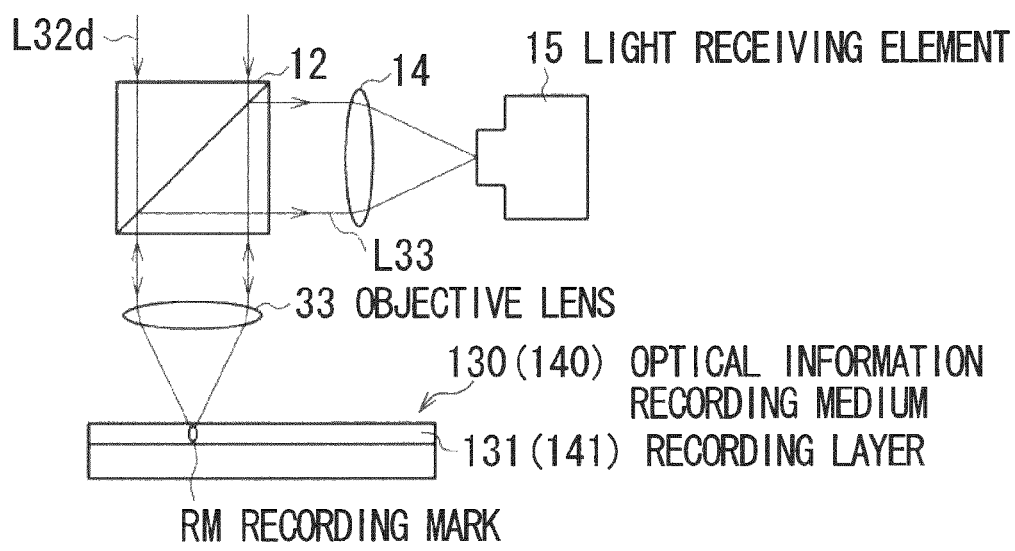

When recording information to the optical information recording medium 130, as shown in FIG. 19A, the optical information recording and reproducing device 30 condenses a recording light beam L32c from the recording and reproducing light source 32 shown in FIG. 17, to the inside of the recording layer 131. In this case, the optical information recording and reproducing device 30 controls the position in the "x" direction, "y" direction, and "z" direction of the optical pickup 35 shown in FIG. 17, and brings the recording light beam L32c shown in FIG. 19A to a focus on a position which is targeted (i.e., target position) in the recording layer 131.

Specifically, the optical information recording and reproducing device 30 in which the target position is set to 100 μm deep from the surface of the recording layer 131, emits the recording light beam L32c consisting of the laser beam whose wavelength is set to 402 nm, and the optical power 20 mW from the recording and reproducing light source 32, condenses this by an objective lens 33 whose NA is set to 0.35, and irradiates to the target position for 1 sec as an irradiating time.

The optical information recording and reproducing device 30, at a time reproducing information, emits reading light beam L32d whose wavelength is the same as recording light beam L32c from recording and reproducing light source 32 and its optical power is 3 mW, and condenses to a recording mark RM in the recording layer 131 by means of the objective lens 33.

At this time, reading light beam L32d is reflected by the recording mark RM and becomes a returned light beam L33. The optical information recording and reproducing device 30 detects the returned light beam L33 through the objective lens 33, a beam splitter 12, and the like, by means of a light receiving element 15.

Figure 20A:
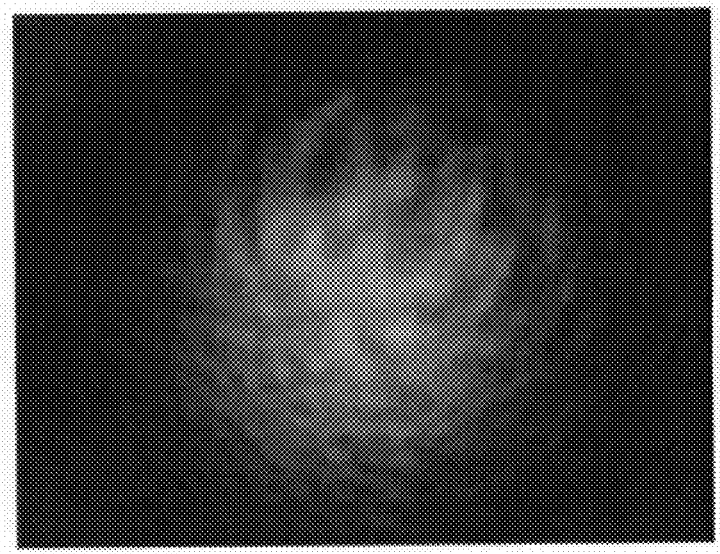
FIGS. 20A and 20B are schematic views indicative of the state of receiving a returned light beam according to a third embodiment of the present invention.

As shown in FIG. 20A, the light receiving element 15 can detect the returned light beam L33 of high intensity similar to the first embodiment shown in FIG. 5A and the second embodiment shown in FIG. 13A.

It is considered that the temperature near the target position in the recording layer 131 is increased locally by condensing of recording light beam L32c, therefore a cavity is formed in the same way as the recording layer 121, and that the reflection factor is improved by difference of refractive index between the material of the recording layer 131 and the cavity.

In this manner, near the target position in the recording layer 131, in the same way as the second embodiment, the recording mark RM of the cavity, whose reflection factor is locally high compared to the surroundings, is formed, and information is recorded. Note that it is difficult to confirm the recording mark RM visually.

Figure 20B:
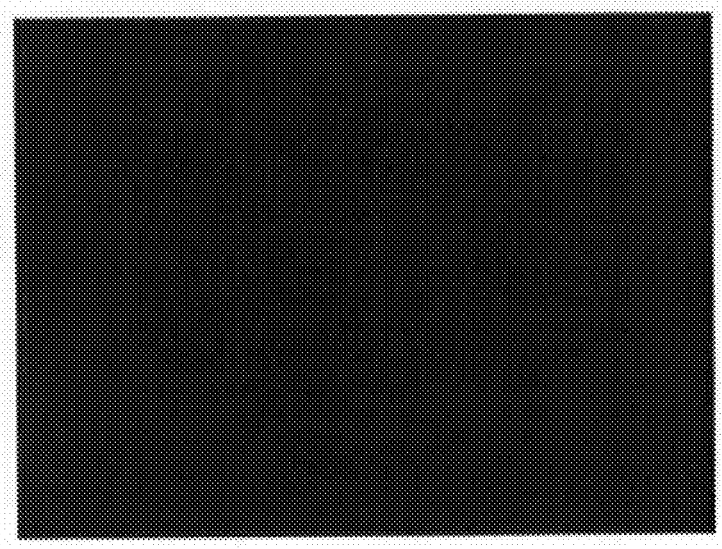

On the other hand, as shown in FIG. 20B, an imperceptible returned light beam L33 is detected from a part where the recording light RM was not recorded (i.e. unrecorded part): when reproducing information from the optical information recording medium 130, in the same way as the first and the second embodiment, a detected intensity for the returning light beam L33 of the optical information recording and reproducing device 30 is largely changed according to whether or not the recording mark RM is present.

In this manner, by condensing the recording light beam L32c by means of the optical information recording medium 130 and increasing the temperature with respect to the recording layer 131 which contains organometalic compound and is optically hardened in advance, the optical information recording and reproducing device 30 can execute recording information of which the recording mark RM of a cavity is formed. Moreover, by irradiating the reading light beam L32d to the recording mark RM, the optical information recording and reproducing device 30 can execute reproducing information of which the returned light beam L33 having high luminance is detected.

(3-4) Comparison to Other Optical Information Recording Medium

Next, for comparison with the optical information recording medium 130, in the optical information recording and reproducing device 30, recording and reproducing of information is executed using an optical information recording medium 140. This optical information recording medium 140 provides a recording layer 141 on a base plate 132 and serves as photopolymer media as a whole.

The recording layer 141, in which an ultraviolet-curable resin (Sony chemical 06A32X-5) is mixed, defoamed in a dark room (to be referred to as liquid material M3) and dispersed in a manner whose thickness "t31" is to be 500 μm on the base plate 132, is optically hardened by irradiating initialization light L31 (wavelength: 365 nm, power density: 300 mW/cm$^2$) for 20 sec from the initialization light source 81 of high pressure mercury lamp.

A photopolymerization initiator which perceives wavelength of ultraviolet is included in the ultraviolet-curable resin of the recording layer 141. Therefore, the recording layer 141 is optically hardened rapidly under the above described condition. Note that the photopolymerization initiator in the recording layer 141 contains neither organometalic compound nor inorganic metal compound.

Next, in the optical information recording and reproducing device 30, using the optical information recording medium 140, recording and reproducing of information is executed in the same manner as above-described optical information recording medium 130.

That is, the optical information recording and reproducing device 30 in which the target position is set to 100 μm deep from the surface of the recording layer 141, emits the recording light beam L32c consisting of the laser beam whose wavelength is set to 402 nm, and the optical power 20 mW from the recording and reproducing light source 32, condenses this by an objective lens 33 whose NA is set to 0.35, and irradiates to the target position for 1 sec as an irradiating time.

The optical information recording and reproducing device 30, at a time reproducing information, emits reading light beam L32d whose wavelength is the same as recording light beam L32c from recording and reproducing light source 32 and its optical power is 3 mW, and condenses to the target position in the recording layer 141 by means of the objective lens 33.

Figure 21A:
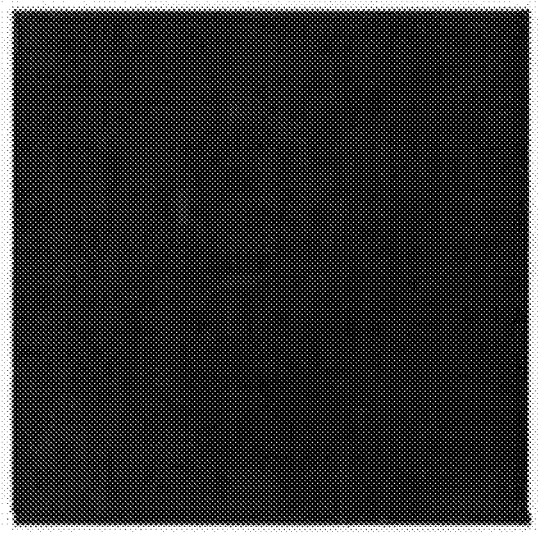
FIGS. 21A and 21B are schematic views indicative of the state of receiving a returned light beam from an optical information recording medium for comparison.
Figure 21B:
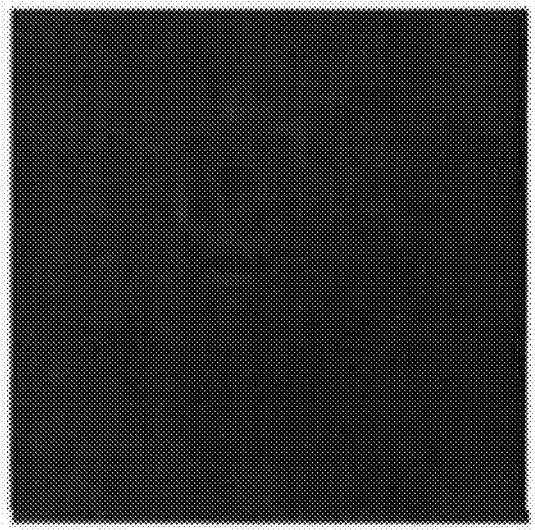

However, in this case, as the result of receiving light by the light receiving element 15 shown in FIG. 21A, an imperceptible returned light beam L33 is obtained from the target position. Furthermore, as shown in FIG. 21B, an imperceptible returned light beam L33 is also obtained from elsewhere than the target position, that is, part where the recording light beam L32c is condensied.

This result of receiving light found that effective recording mark RM does not form in the optical information recording medium 140.

Compared with the optical information recording media 130 and 140, it is considered that forming of recording mark RM results from transubstantiation of resin containing organometalic compound or inorganic metal compound by heat of the recording light beam L32c.

For the above described reason, the optical information recording medium 140 having the recording layer 141 not containing organometalic compound or inorganic metal compound therein, may not serve effectively as a recording medium of information with respect to the optical information recording and reproducing device 30.

(3-5) Operation and Effect

In the above-described configuration, the optical information recording and reproducing device 30 according to the third embodiment, forms a cavity near the target position with respect to the recording layer 131 in the optical information recording medium 130 which contains organometalic compound and is optically hardened in advance, by condensing the recording light beam L32c emitted from the recording and reproducing light source 32 to the target position and increasing the temperature, forms a cavity near the target position, improves the refractive index, and forms the recording mark RM.

Moreover, the optical information recording and reproducing device 30 condenses the reading light beam L32d having a comparatively weak light intensity to the target position in the recording layer 131 of the optical information recording medium, and then receives the returned light beam L33 having a strong light intensity which is reflected by the recording mark RM.

Accordingly, similar to the optical information recording medium 120 in the second embodiment, since the recording layer 131 is optically hardened in advance, the optical information recording medium 130 can form the recording mark RM in the state where photoreaction have been completed previously.

Furthermore, similar to the optical information recording medium 120, since the resin which constitutes the recording layer 131 includes organometalic compound, the optical information recording medium 130 can keep the reflection factor of light low at the part where still initializing, and can form the recording mark RM of high reflection factor by condensing the recording light beam L32c, increasing temperature locally, causing transubstantiation of the resin, and forming the cavity.

At this time, since the photoreaction in the recording layer 131 has been completed, the optical information recording medium 130 can increase the temperature near the target position reliably without causing a change of photoreaction rate or a change of thermal conductivity derived from occurrence of a photon mode.

In this manner, the optical information recording medium 130 can make the temperature near the target position in the recording layer 131 above the boiling point of the resin which constitutes the recording layer 131, to generate a cavity, and can form the recording mark RM reliably.

Accordingly, when irradiating the reading light beam L32d from the optical information recording and reproducing device 30 at the time of reproducing information, the optical information recording medium 130 can detect the significantly strong returned light beam L33 from the recording mark RM as compared with part where the recording mark RM is not formed. In other words, the optical information recording medium 130, similar to the optical information recording medium 100 in the first embodiment, can generate reproduced signals of significantly high SNR by the optical information recording and reproducing device 30, making it possible to reproduce information with accuracy and stably.

In case of using the optical information recording medium 140 for comparison, since effective recording mark RM is not formed in the recording layer 141 which contains neither organometalic compound nor inorganic metal compound, it found that the recording mark RM is surely caused by increasing of temperature or thermal destruction by condensing the recording light beam L32c with respect to the organometalic compound or inorganic metal compound.

In the above-described configuration, the optical information recording medium 130 according to the third embodiment can form a cavity near the target position in the recording layer 131 in the optical information recording medium 130 which contains organometalic compound and is optically hardened in advance, by condensing the recording light beam L32c to the target position by optical information recording and reproducing device 30 and increasing the temperature, can form the recording mark RM improved the refractive index, and can retrieve information represented whether or not the recording mark RM is present stably by detecting the returned light beam L33 having sufficient light amount reflected off the recording mark RM.

(4) Fourth Embodiment (4-1) Configuration of Optical Information Recording and Reproducing Device In the fourth embodiment, since the optical information recording and reproducing device 20 is used in the same manner as the second embodiment, its explanation will be omitted.

(4-2) Configuration of Optical Information Recording Medium

On the other hand, in the fourth embodiment, an optical information recording medium 150 is used instead of the optical information recording medium 120. The optical information recoding medium 150 sandwiches in a spacer 124 between base plates 122 and 123. As a result, a recording layer 151 is formed in an internal space 124A in the spacer 124. Therefore, the optical information recording medium serves as photopolymer media as a whole.

Figure 11:
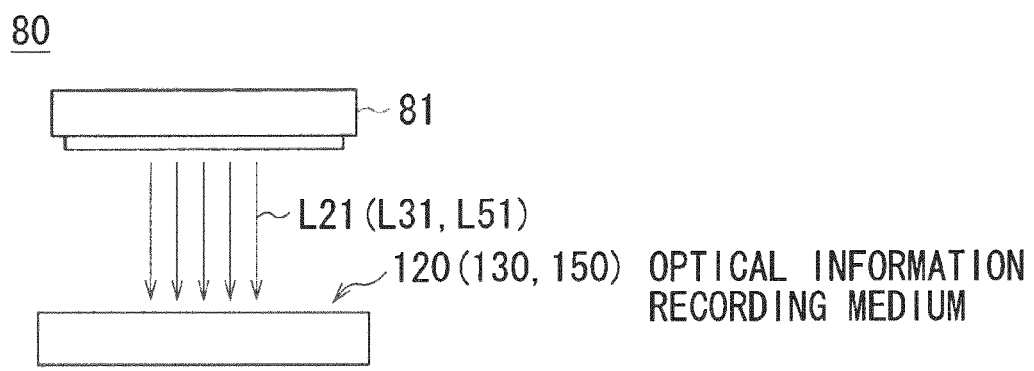
FIG. 11 is a schematic view indicative of the configuration of an initialization device.

At the fabrication stage, the recording layer 151, on which a liquid material M4 to be referred later is spread in an internal space 124A sandwiching in the spacer 124 between the base plates 122 and 123, is initializes by an initialization light L51 irradiated from an initialization light source 81 in the initialization device 80 as shown in FIG. 11.

In the recording layer 151, in the same manner as the recording layer 121 in the second embodiment, a photoreactive resin including organometal or inorganic metal compound is dispersed uniformly. The recording layer 151 has a property in which a moleculaer weight is increased by the photoreaction of photoreactive resin in the area irradiated by light in the state of before the initialization, then hardened, and then the refractive index is changed accordingly.

Specifically, the recording layer 151 is made by mixing acrylic acid ester monomer (p-cumylphenol ethyleneoxide addition acrylic acid ester) and urethane bifunctional acrylate olygomer (weight ratio: 40:60); and 1-hydroxy-1-cyclohexyl phenylketone (Irg-184) whose weight ratio with respect to the monomer and olygomer is 1% and $TiO_2/H_2PtCl_6$ (molar ratio: 10:1) whose weight ratio with respect to the monomer and olygomer is 1% and grain size is 20 nm or less, as inorganic metal compound and defoaming under a dark room (referred to as liquid material M4, hereinafter), dispersed in the internal space 124A sandwiching in the spacer 124 between the base plates 122 and 123, irradiated by the initialization light L51 (wavelength: 365 nm, power density: 300 mW/cm$^2$) from the initialization light source 81 which is a high pressure mercury lamp for 20 sec and is optically hardened.

In this initialization processing, in the entire recording layer 151, since the photoreaction is brought about totally in a similar way to the initialization processing (precure) in the first embodiment, the photopolymerization reaction, the photocrosslinking reaction, or both reaction of the resin is brought about internally. As a result, the refractive index of the recording layer 151 is totally changed compared to before irradiating by initialization light. Note that the recording layer 151 is almost transparent when optically hardened and can transmit the irradiated light at a high rate.

The optical information recording medium 150 has a partially similar configuration with respect to the optical information recording medium 120 in the second embodiment, and is formed into a thin plate as a whole, transmits most light in which the resin in the recording layer 151 photoreacts by initialization processing, and includes a little amount of inorganic metal compound in the recording layer 151.

(4-3) Recording and Reproduction of Information

Next, the manner of recording information to the optical information recording medium 150, and the manner of reproducing information from the optical information recording medium 150 in the fourth embodiment will be explained.

Note that, similar to the optical information recording medium 120 in the second embodiment, since the initialization processing according to the first embodiment with respect to the optical information recording medium 150 has been completed by hardening optically at the fabrication stage, there is no need to execute the initialization processing again.

When recording information to the optical information recording medium 150, as shown in FIG. 12A, the optical information recording and reproducing device 20 condenses a recording light beam L52c from the recording and reproducing light source 22 shown in FIG. 9, to the inside of the recording layer 151. In this case, the optical information recording and reproducing device 1 controls the position in the "x" direction, "y" direction, and "z" direction of the optical pickup 25 shown in FIG. 9, and brings the recording light beam L52c shown in FIG. 12A to a focus on a position which is targeted (i.e., target position) in the recording layer 151.

Specifically, the optical information recording and reproducing device 20 in which the target position is set to 100 μm deep from the surface of the recording layer 151, emits the recording light beam L52c consisting of the laser beam whose wavelength is set to 402 nm, and the optical power 20 mW from the recording and reproducing light source 22, condenses this by an objective lens 23 whose NA is set to 0.35, and irradiates to the target position for 2 sec as an irradiating time.

The optical information recording and reproducing device 20, at a time reproducing information, emits reading light beam L52d whose wavelength is the same as recording light beam L52c from recording and reproducing light source 22 and its optical power is 600 μW, and condenses to a recording mark RM in the recording layer 151 by means of the objective lens 23.

At this time, reading light beam L52d is reflected by the recording mark RM and becomes a returned light beam L53. The optical information recording and reproducing device 20 detects the returned light beam L53 through the objective lens 23, a beam splitter 12, and the like, by means of a light receiving element 15.

Figure 22A:
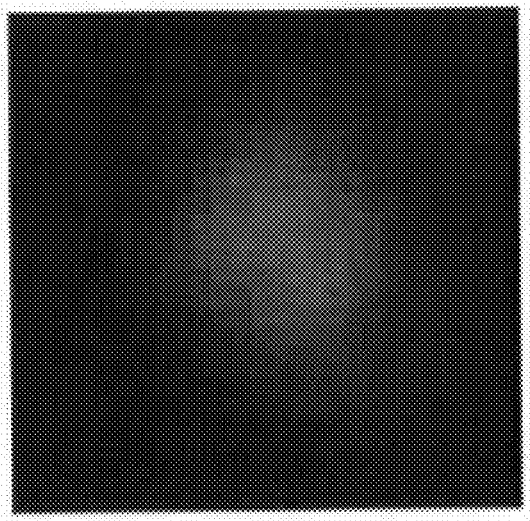
FIGS. 22A and 22B are schematic views indicative of the state of receiving a returned light beam according to a fourth embodiment of the present invention.

As shown in FIG. 22A, the light receiving element 15 can detects the returned light beam L53 of high intensity similar to the first embodiment shown in FIG. 5A and the second embodiment shown in FIG. 13A.

Figure 22B:
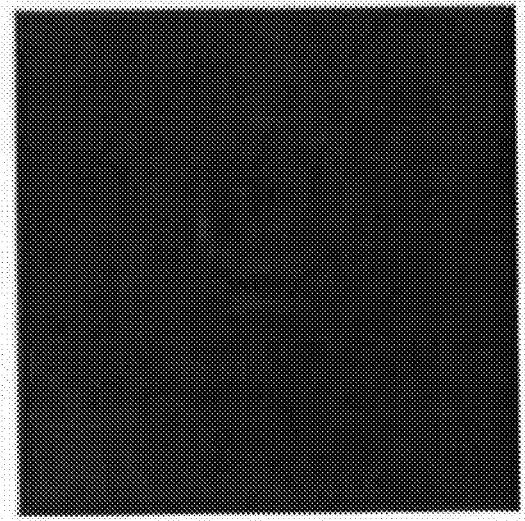

On the other hand, as shown in FIG. 22B, an imperceptible returned light L53 is detected from a part where the recording light RM was not recorded (i.e. unrecorded part): when reproducing information from the optical information recording medium 150, in the same way as the first to the third embodiment, a detected intensity for the returned light beam L53 of the optical information recording and reproducing device 20 is largely changed according to whether or not the recording mark RM is present.

In this manner, by condensing the recording light beam L52c by means of the optical information recording medium 150 with respect to the recording layer 151 which contains inorganic metal compound and is optically hardened in advance, and increasing the temperature, in the same way as the first to the third embodiment, the optical information recording and reproducing device 20 can execute recording information of which the recording mark RM of a cavity is formed. Moreover, by irradiating the reading light beam L52d to the recording mark RM of the optical information recording medium 150, the optical information recording and reproducing device 20 can execute reproducing information of which the returned light beam L53 having high luminance is detected.

(4-4) Operation and Effect

In the above-described configuration, the optical information recording and reproducing device 20 according to the fourth embodiment forms a cavity near the target position with respect to the recording layer 151 in the optical information recording medium 150 which contains inorganic metal compound, and is optically hardened in advance, by condensing the recording light beam L52c emitted from the recording and reproducing light source 22 to the target position and increasing the temperature, improves the refractive index, and forms the recording mark RM.

Moreover, the optical information recording and reproducing device 20 condenses the reading light beam L52d having a comparatively weak light intensity to the target position in the recording layer 151, and then receives the returned light beam L53 having a strong light intensity which is reflected by the recording mark RM.

Accordingly, similar to the optical information recording medium 120, since the recording layer 151 is optically hardened in advance, the optical information recording medium 150 can form the recording mark RM in the state where photoreaction have been completed previously. When the recording light beam L52c is condensed to near the target position in the recording layer 151, the thermal destruction of inorganic metal compound is surely caused. Accordingly, the optical information recording medium 150 can form a cavity, and heighten the refractive index of light locally, that is, form the recording mark RM.

For this reason, when the reading light beam L22 is irradiated by the optical information recording and reproducing device 20, the optical information recording medium 150 can detect the significantly strong returned light beam L53 from the recording mark RM as compared with part where the recording mark RM is not formed. In other words, the optical information recording medium 150, similar to the first embodiment through the third embodiment, can generate reproduced signals of significantly high SNR by the optical information recording and reproducing device 20, making it possible to reproduce information with accuracy and stably.

In the above-described configuration, the optical information recording medium 150 according to the fourth embodiment, similar to the second and the third embodiments, can form a cavity near the target position in the recording layer 151 which contains inorganic metal compound and is optically hardened in advance, by condensing the recording light beam L52c to the target position by optical information recording and reproducing device 20 and increasing the temperature, can form the recording mark RM improved the refractive index, and can retrieve information represented whether or not the recording mark RM is present stably by detecting the returned light beam L53 having sufficient light amount reflected off the recording mark RM.

(5) Other Embodiments

In the above-described embodiment, the recording layers 121, 131, and 151 of the optical information recording media 120, 130, and 150 is configured by photopolymerization resin including radical polymerization compound and the photopolymerization initiator including orogonometalic compound, inorganic metal compound, or the both, however, the present invention is not restricted thereto, and the recording layers 121, 131, and 151 may be configured by other compounds.

As the constituent material of photopolymerization resin configuring the recording layers 121, 131, and 151, in general, a compound which can be photopolymerized is considered, and other than this, binder polymer, oligomer, initiator to carry out the photopolymerization may be employed, and further, according to need, sensitizing dye may be added.

As compounds which can be photopolymerized, mainly, there are derivatives of acrylic acid, acrylic ester, and amide acrylate, and derivatives of styrene and vinylnaphthalene, etc. which are monomers used in radical polymerization reaction. Furthermore, a compound in which acrylic monomers are included in urethane structure can be employed.

Furthermore, as the above-described monomers, derivatives in which the hydrogen atom is replaced with the halogen atom may be employed.

On the other hand, as binder components which are added according to need, there are ethylene glycol, glycerin and derivatives thereof, polyhydric alcohol, phthalate ester and derivatives thereof, naphthalenedicarboxylic acid and derivatives thereof, phosphate ester and derivatives thereof, fatty acid diester and derivatives thereof, which are compounds that can be used as a plasticizer.

Furthermore, as photopolymerization initiators of initiator type, other than bis(2,4-cyclopentadiene-1-yl)bis[2,6-difluoro-3-(1H pyro 1 yl)phenyl]titanium(Ciba Chemicals Irg-784), there are 2,2-dimethoxy-1,2-diphenylethane-1-on, 2-benzyl-2-dimethylamino-1-(4-morpholinophenyl)-butanone-1,1-hydroxycyclohexyl-phenyl-ketone, which are organic compounds used for radical polymerization. As a photopolymerization initiator which is used at this time, a compound which can be arbitrarily dissolved in the post-processing after recording information is desirable.

Furthermore, as sensitizing dye, there are cyanine type dye, coumarin type dye, and quinoline type dye.

Furthermore, in the above-described first embodiment, in the initialization processing (FIG. 3A), the initialization light L1 being parallel light is irradiated to the optical information recording medium 100, however, the present invention is not restricted thereto, and the initialization light L1 being diffusion light or convergent light may be irradiated to the optical information recording medium 100. The same applies to the initialization light source 81 in the second to fourth embodiment.

Furthermore, in the above-described first embodiment, the wavelengths of the initialization light L1 to initialize the optical information recording medium 100, the recording light beam L2c to record information to the optical information recording medium 100, and the reading light beam L2d to reproduce information from the optical information recording medium 100 are unified to 532 nm, however, the present invention is not restricted thereto, and there may be employed a configuration in which the wavelengths of the recording light beam L2c and reading light beam L2d are unified and the wavelength of the initialization light L1 is set different therefrom, or a configuration in which the wavelengths of the initialization light L1, recording light beam L2c, and reading light beam L2d are set different from each other.

In this case, it is desired that the initialization light L1 has a wavelength which is suitable for the sensitivity at the time of photochemical reaction in photopolymerization-type photopolymer configuring the recording layer 101, and the recording light beam L2c has a wavelength under which the temperature is increased due to the heat conduction or the beam can be easily absorbed, and the reading light beam L2d has a wavelength under which the highest resolution can be obtained. At this time, it is desired that the NA etc. of the objective lens 13 (FIG. 1) is arbitrarily adjusted according to the wavelengths of the recording light beam L2c and reading light beam L2d, and furthermore, in recording information and reproducing information, two objective lenses optimized for the recording light beam L2c and reading light beam L2d may be switched to be used.

Furthermore, with respect to photopolymerization-type photopolymer configuring the recording layer 101, the component thereof etc. may be arbitrarily adjusted so that the most desirable characteristics can be obtained under the combination of the wavelengths of the initialization light L1, recording light beam L2c, and reading light beam L2d.

Furthermore, in the second through the fourth embodiments, the wavelength of the recording light beams L22c, L32c, and L52c, and the reading light beams L22d, L32d, and L52d emitted from the recording and reproducing light sources 22 and 32 are set to 402 nm, however, it is possible to use another wavelengths so that a cavity is formed appropriately by increasing temperature near the target position in the recording layers 121, 131, and 151 efficiently.

Furthermore, in the above-described first embodiment, the initialization light L1, recording light beam L2c, and reading light beam L2d are irradiated from the base plate 102 side of the optical information recording medium 100 respectively, however, the present invention is not restricted thereto, and the respective light or beams may be irradiated from either side such as the initialization light L1 is irradiated from the base plate 103 side. The same applies to the initialization light source 81 in the second to fourth embodiment.

Furthermore, in the above-described first embodiment, the thickness "t1" (FIG. 2) of the recording layer 101 is set to approximately 0.3 mm, the interval between the recording marks RM in the mark recording layer is set to 3 µm, and the interval between the mark recording layers is set to approximately 15 µm, and 17 layers are overlapped, however, the present invention is not restricted thereto, and the thickness "t1" of the recording layer 101 may be set to approximately 1.0 mm, the interval between the recording marks RM in the mark recording layer may be set to 5 µm, and the interval between the mark recording layers may be set to approximately 20 µm, and 50 layers may be overlapped, that is, the respective values may be arbitrarily adjusted according to the thickness "t1" of the recording layer 101, the size of the recording marks RM formed in the recording layer 101, the various optical characteristics of photopolymerization-type photopolymer, the optical characteristics of the objective lens 13, etc.

Furthermore, the above described second through the fourth embodiments, the recording layer 121, 131 and 151 form a recording mark RM, however, the present invention is not restricted thereto, and, similar to the first embodiment, by changing of the target position within the "xy" plane suitably, a mark recording layer on which the recording mark RM is aligned in the plane is formed. Moreover, by changing the position of "z" direction of the target position (that is, depth from the surface) gradually, the recording mark is formed multitiered. In this case, the thicknesses "t21" and "t31" of the recording layers 121, 131, and 151 are adjusted suitably according to the number of layers to be formed.

Furthermore, in the above-described first embodiment, the optical information recording medium 100 is fixed on the table 4, and, by shifting the optical pickup 5 in the "x" direction, "y" direction, and "z" direction, the recording mark RM is formed by setting an arbitrary position in the recording layer 101 to the target position, however, the present invention is not restricted thereto, and, by configuring the optical information recording medium 100 as an optical disc such as a compact disc (CD) or a digital versatile disc (DVD), information may be recorded and reproduced by driving to rotate the optical disc and shifting the optical pickup 5 in the "x" direction and "z" direction. In this case, it is desired to form tracks configured by grooves or pits at the boundary of the base plate 102 and the recording layer 101 to perform the tracking control, focusing control and the like. The same applies to the initialization light source 81 in the second to fourth embodiment.

Furthermore, in the above-described embodiment, the recording layer 101 of the optical information recording medium 100 is in the form of a square plate or a rectangle plate which has its one side set approximately to 30 to 80 mm, and has its thickness "t1" set approximately to 0.3 to 1 mm, however, the present invention is not restricted thereto, and arbitrary dimensions may be employed, or various figurations such as a rectangular solid or a disc of various dimensions may be employed. In this case, it is desired that the thickness "t1" in the "z" direction be determined in consideration of the transmission factor etc. of the recording light beam L2c and reading light beam L2d. The same applies to the second to fourth embodiment.

Accordingly, the figuration of the base plates 102 and 103 is not restricted to a square plate or a rectangle plate, and various figurations may be employed according to the figuration of the recording layer 101. Furthermore, the material of the base plates 102 and 103 is not restricted to glass, and may be polycarbonate etc., and any material can be employed so long as the initialization light L1, recording light beam L2c, reading light beam L2d, and returned light beam L3 can be transmitted with a high transmission factor. Furthermore, in case a desired intensity can be obtained using only the recording layer 101 itself, the base plates 102 and 103 may be omitted from the optical information recording medium 100. The same applies to the second to fourth embodiment.

Furthermore, in the above-described embodiment, the optical information recording media 121, 131, and 151 are configured by the recording layers 120, 130, and 150 10 as recording layer, however, the present invention is not restricted thereto, and the optical information recording medium be configured by a recording layer of other various configurations.

The present invention can be applied to an optical disc device that records and reproduces large amount of information such as video contents, audio contents, etc. to and from a recording medium such as an optical disc.

It should be understood by those skilled in the art that various modifications, combinations, sub-combinations and alterations may occur depending on design requirements and other factors insofar as they are within the scope of the appended claims or the equivalents thereof.

What is claimed is:

1. A method of recording and reproducing information on an optical information recording medium including a recording layer, the method comprising:

initializing at least a part of the recording layer, which includes an inorganic metal compound dispersed in a resin containing a photopolymerization property, a photocrosslinking property, or both the photopolymerization and the photocrosslinking properties, the step of initializing including uniformly hardening the resin via a photoreaction by irradiating the medium with a predetermined initialization light having a wavelength of 365 nm, the initialization light being parallel light, forming a cavity as a recording mark in the recording layer to record information by condensing a recording light to the medium and increasing a temperature of the medium near a focal point of the recording light such that the inorganic metal compound is transubstantiated, and irradiating the recording mark in the recording medium with a predetermined reading light to reproduce the information based on returned light.

2. The method according to claim 1, wherein the an inorganic metal compound is $TiO_2/H_2PtCl_6$.

* * * * *